United States Patent
Sawayama

[19]

[11] Patent Number: 6,048,071
[45] Date of Patent: Apr. 11, 2000

[54] FRONT ILLUMINATION DEVICE AND REFLECTION-TYPE LIQUID CRYSTAL DISPLAY DEVICE INCORPORATING SAME

[75] Inventor: Yutaka Sawayama, Tenri, Japan

[73] Assignee: Sharp Kabushiki Kaisha, Osaka, Japan

[21] Appl. No.: 09/046,320

[22] Filed: Mar. 23, 1998

[30] Foreign Application Priority Data

Mar. 28, 1997 [JP] Japan .................................. 9-078226

[51] Int. Cl.[7] ...................................................... F21V 8/00
[52] U.S. Cl. ........................... 362/31; 362/327; 362/331; 349/63; 349/65
[58] Field of Search ................................. 349/62, 63, 64, 349/65; 362/26, 31, 97, 98, 99, 330, 331, 327

[56] References Cited

U.S. PATENT DOCUMENTS

| | | | |
|---|---|---|---|
| 2,761,056 | 8/1956 | Lazo | 362/26 |
| 3,500,034 | 3/1970 | Bissell | 362/98 |
| 4,124,279 | 11/1978 | Byles | 349/63 |
| 4,212,048 | 7/1980 | Castleberry | 349/63 |
| 5,485,354 | 1/1996 | Ciupke et al. | 362/31 |
| 5,581,380 | 12/1996 | Bergman | 349/63 |
| 5,608,550 | 3/1997 | Epstein et al. | 349/57 |
| 5,772,305 | 6/1998 | Ishikawa et al. | 362/31 |

FOREIGN PATENT DOCUMENTS 5-158 034  6/1993  Japan .

OTHER PUBLICATIONS

"A Transparent Front Lighting System for Relective–Type Displays" C.Y. Tai et al., Society for Information Display International Symposium Digest of Technical Papers vol. XXVI, Walt Disney World Dolphin Hotel, Orlando, Florida, May 23–25, 1995 pp. 375–378.

*Primary Examiner*—Alan Cariaso
*Attorney, Agent, or Firm*—Dike, Bronstein, Roberts & Cushman, LLP; William J. Daley, Jr.

[57] ABSTRACT

A front-light, to be used by mounting on the front of a reflection-type LCD, etc., is provided with a light-conducting body having a light-entry surface, through which light enters from a light source, and a light exit surface, through which light is projected toward a liquid crystal cell; the light-entry surface being provided so as to incline with respect to the normal direction of the light exit surface.

24 Claims, 27 Drawing Sheets

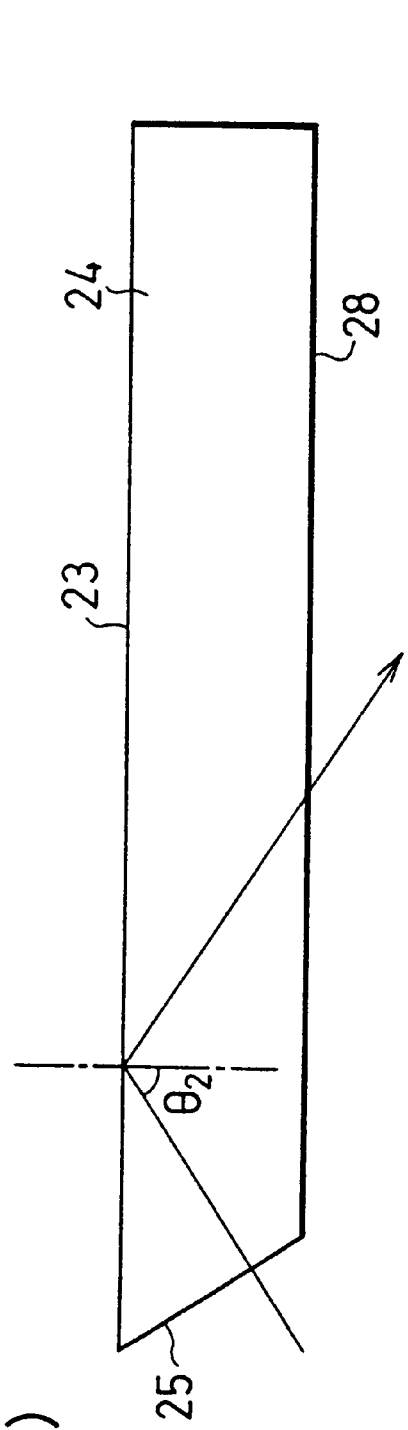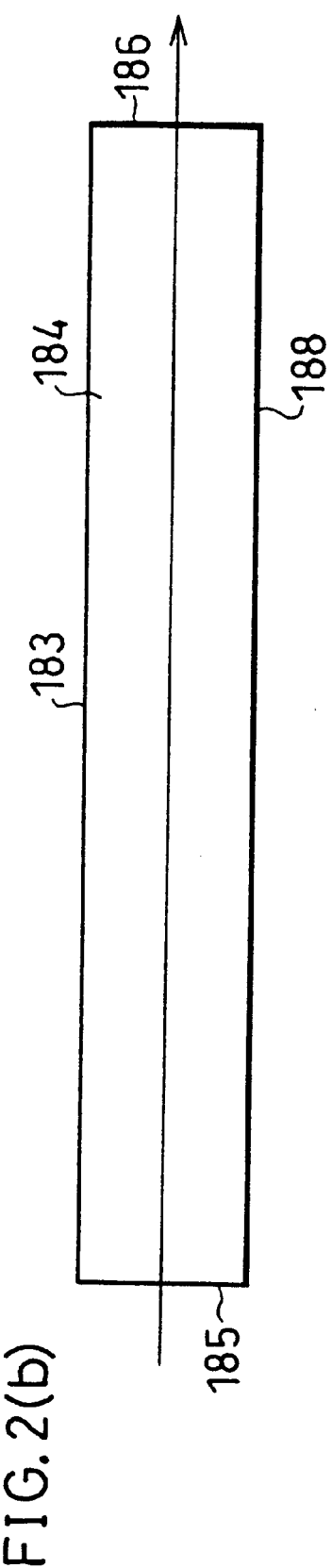
FIG.2(a)
FIG.2(b)

FRONT ILLUMINATION DEVICE AND REFLECTION-TYPE LIQUID CRYSTAL DISPLAY DEVICE INCORPORATING SAME

FIELD OF THE INVENTION

The present invention concerns a front illumination device to be used by mounting between an illuminated object and a viewer, and which is structured so as to project light onto the illuminated object and to transmit light reflected from the illuminated object so that the reflected light will be visible to the viewer, and concerns a reflection-type liquid crystal display device incorporating this front illumination device as an auxiliary light source.

BACKGROUND OF THE INVENTION

Unlike other displays such as the CRT (Cathode Ray Tube), PDP (Plasma Display Panel), or EL (Electro Luminescence), in liquid crystal display devices, the liquid crystal itself does not emit light, but displays letters or images by regulating the quantity of light transmitted from a specific light source.

Conventional liquid crystal display devices (hereinafter referred to as "LCDs") can be roughly divided into transmission-type LCDs and reflection-type LCDs. Transmission-type LCDs include a fluorescent tube or surface luminescent light source such as an EL provided on the back of the liquid crystal cell as a light source (back-light).

On the other hand, reflection-type LCDs, since they perform display using surrounding light, do not require a back-light, and thus have the advantage of low power consumption. Further, in very bright areas such as in direct sunlight, whereas the display of light-emitting displays and transmission-type LCDs becomes nearly impossible to see, that of reflection-type LCDs becomes more clearly visible. For this reason, reflection-type LCDs are applied in devices such as portable information terminals and mobile computers, for which demand has grown in recent years.

However, reflection-type LCDs have the following problems. Namely, since reflection-type LCDs use surrounding light, the brightness of display is highly dependent on the surrounding environment, and, in darkness, such as at night, there are cases when the display is not visible at all. This problem is particularly serious with reflection-type LCDs which use a color filter for color display or which use a polarizing plate, and auxiliary illumination is needed to provide against cases when surrounding light is insufficient.

However, since reflection-type LCDs are provided with a reflective plate on the back of the liquid crystal cell, they cannot use a back-light like that of transmission-type LCDs. A device called a "semi-transmission-type LCD" has been proposed, but since its display characteristics, being midway between transmission-type and reflection-type, are neither here nor there, practical application of this device is expected to be difficult.

Therefore, as auxiliary illumination for reflection-type LCDs when surrounding light is insufficient, a front-light system, for mounting on the front of the liquid crystal cell, has been proposed. Generally, such front-light systems have been made up of a light-conducting body and a light source provided at the side of the light-conducting body. Light projected by the light source from the side of the light-conducting body travels through the interior of the light-conducting body, and is reflected toward the liquid crystal cell by forms provided on the surface of the light-conducting body. As it passes through the liquid crystal cell, the projected light is modulated in accordance with the display information, and, being reflected by the reflective plate provided on the back of the liquid crystal cell, passes again through the light-conducting body toward the viewer. By this means, the viewer is enabled to see the display even when the surrounding light is insufficient.

Front-light systems of this type are disclosed, for example, in Japanese Unexamined Patent Publication No. 5-158034/1993 (Tokukaihei 5-158034) and in SID DIGEST (1995), p. 375.

The following will explain in brief the driving principle of the front-light system disclosed in SID DIGEST (1995), p. 375 with reference to FIG. 26. This front light system is provided with a light-conducting body 104, which has an interface 101 made up of flat portions 101a and inclined portions 101b, one side of the light-conducting body 104 being a light-entry surface 105, through which light from a light source 106 enters the light-conducting body 104. In other words, the light source 106 is provided in a position opposite the light-entry surface 105 of the light-conducting body 104.

Some of the light from the light source 106 entering the light-conducting body 104 from the light-entry surface 105 travels straight, and some of it is projected onto interfaces 101 and 108 between the light-conducting body 104 and the surrounding medium. At this time, if the medium surrounding the light-conducting body 104 is air, and if the refractive index of the light-conducting body 104 is around 1.5, then, according to Snell's law (Equation 1), light with an angle of incidence at the interfaces 101 and 108 of approximately 41.8° or more will be totally reflected.

$$n_1 \cdot \sin\theta_1 = n_2 \cdot \sin\theta_2$$
$$\theta_c = \arcsin(n_2/n_1) \quad \text{(Equation 1)}$$

Here, $n_1$ is the refractive index of the first medium (here, the light-conducting body 104);

$n_2$ is the refractive index of the second medium (here, air);

$\theta_1$ is the angle of incidence from the light-conducting body 104 at the interface 101;

$\theta_2$ is the angle of light exiting from the interface 101 to the second medium; and $\theta_c$ is the critical angle.

Of the light projected onto the interfaces 101 and 108, the portion of light which is totally reflected from the inclined portions 101b (which are reflective surfaces) and the portion of light which, after being reflected from the interface 108, is reflected from the inclined portions 101b, are projected into a liquid crystal cell 110. Light projected into the liquid crystal cell 110, after being modulated by a liquid crystal layer (not shown), is reflected from a reflective plate 111 provided on the back of the liquid crystal cell 110, is projected once again into the light-conducting body 104, and passes through the flat portions 101a toward the viewer 109.

Light from the light source 106 entering through the light-entry surface 105 which is projected, not onto the inclined portions 101b, but onto the flat portions 101a, continues being transmitted and reflected between the interfaces 101 and 108 until it reaches an inclined portion 101b. Incidentally, the inclined portions 101b are provided so that their area, in comparison with the area of the flat portions 101a, is sufficiently small when viewed by the viewer.

The foregoing front-light system has the following problems.

(1) As shown in FIG. 27, light which does not reach an inclined portion 101b even after repeated reflections, and light which enters the light-entry surface 105 substantially perpendicularly, exit the light-conducting body 104 from a surface 107 opposite the light-entry surface 105 as light 114, and cannot be used in display. This problem is more marked the smaller the panel is, and with the sizes typically used in portable information terminals (5 in. to 6 in. diagonal), most of the light from the light source exits the light-conducting body, and thus the efficiency of light use is very poor.

(2) The form of the interface 101, which is made up of inclined portions 101b and flat portions 101a, is similar to that of a prism sheet with the peaks of the prisms flattened. Thus, as shown in FIG. 27, surrounding light 115 is easily reflected back toward the viewer 109, which leads to impairment of display quality.

Since most conventional front-light systems share these problems, improvement of the efficiency of use of light from the light-source is needed.

SUMMARY OF THE INVENTION

The object of the present invention is to provide a front illumination device comprising a light source and a light-conducting body which guides light from the light source to an illuminated object, to be used by mounting in front of the illuminated object, which is able to effectively use the light from the light source; and to provide a reflection-type liquid crystal display device which, by incorporating this front illumination device, is capable of bright display even when surrounding light is insufficient.

In order to attain the foregoing object, a front illumination device according to the present invention comprises a light source and a first light-conducting body which guides light from the light source to an illuminated object, and is to be used by mounting in front of the illuminated object; the first light-conducting body being a polyhedron provided with a light-entry surface, through which light from the light source enters, a first light exit surface, through which light exits toward the illuminated object, and a second light exit surface opposite the first light exit surface; the first and second light exit surfaces being provided substantially parallel, or such that the interval therebetween grows smaller the greater the distance from the light-entry surface; and the light-entry surface being provided so as to incline with respect to the normal direction of the first light exit surface.

In the above-mentioned front illumination device, light from the light source enters the first light-conducting body through the light-entry surface and is projected from the first light exit surface toward the illuminated object, and light reflected from the illuminated object passes through the first light exit surface, and then exits through the second light exit surface toward the viewer. In short, the device is used by mounting in front of the illuminated object.

In the foregoing structure, since the light-entry surface is provided so as to incline with respect to the normal direction of the first light exit surface, and the first and second light exit surfaces are provided substantially parallel, or such that the interval therebetween grows smaller the greater the distance from the light-entry surface, in comparison with a structure in which a light-entry surface is provided perpendicular to the first light exit surface, the area of the light-entry surface can be increased, without increasing the greatest thickness of the first light-conducting body from the first light exit surface. Consequently, more light from the light source can be admitted, and a bright front illumination device, which uses light from the light source more efficiently, can be provided.

The foregoing structure has the following advantages, particularly when the angle of inclination of the second light exit surface with respect to the first light exit surface is close to 0°, i.e., when the two light exit surfaces are close to parallel. In this case, if the light-entry surface is perpendicular to the first light exit surface, some light entering perpendicular to the light-entry surface leaks out of the light-conducting body from the surface opposite the light-entry surface. This kind of leakage decreases the efficiency of use of light from the light source. However, with the front illumination device according to the present invention, since the light-entry surface is provided so as to incline with respect to the normal direction of the first light exit surface, light entering perpendicular to the light-entry surface is projected onto the first or second light exit surface, thus increasing the efficiency of use of light entering perpendicular to the light-entry surface.

The above-mentioned front illumination device may also be structured such that the angle of the light-entry surface with respect to the first light exit surface is an obtuse angle.

If the angle of the light-entry surface with respect to the first light exit surface is an acute angle, a portion of the light from the light-entry surface is projected directly to the first light exit surface. This portion is projected onto the first light exit surface at a very large angle of incidence, and, taking into consideration spreading of light from the light source, also includes a portion which is projected onto the first light exit surface at an angle of incidence close to 90°. This portion is reflected from the first light exit surface, becomes stray light, and is projected through the second light exit surface toward the viewer, giving rise to the problem of impairment of display quality of the illuminated object image.

In contrast, the structure of the present invention, in which the angle of the light-entry surface with respect to the first light exit surface is an obtuse angle, can reduce the portion of light which is projected from the light-entry surface directly onto the first light exit surface and becomes stray light. As a result, a front illumination device can be provided which uses light from the light source efficiently, and which enables a bright illuminated object image.

The above-mentioned front illumination device may also be structured such that the shape of the first light-conducting body in cross-section taken along a plane perpendicular to the light-entry surface and to the first light exit surface is triangular.

With this structure, since the first light-conducting body is completely wedge-shaped, light, among that entering the first light-conducting body from the light source, which travels parallel to the first light exit surface does not escape from the first light-conducting body. Consequently, the advantage of this structure is that the efficiency of use of light from the light source is further improved.

The above-mentioned front illumination device may also be structured such that the first and second light exit surfaces are substantially parallel, and such that the following inequality is satisfied, where $\beta$ is an angle formed by the light-entry surface and the normal direction of the first light exit surface, $\pm \gamma$ is an angle of spread of the light after entering the first light-conducting body, and $\theta_{c2}$ is the critical angle of the second light exit surface:

$$\theta_{c2} \leq 90° - \beta - \gamma$$

By setting the values of $\beta$ and $\gamma$ so as to satisfy the foregoing inequality, the light projected onto the second light exit surface is totally reflected, and thus does not escape toward the viewer. As a result, the light from the light source can be projected onto the illuminated object without waste, thus improving the efficiency of use of light from the light source, and unnecessary leakage of light toward the viewer can be prevented, thus enabling a bright illuminated object image.

The above-mentioned front illumination device may also be structured such that the interval between the first and second light exit surfaces grows smaller the greater the distance from the light-entry surface, and such that the following inequality is satisfied, where $\alpha$ is the angle of inclination of the second light exit surface with respect to the first light exit surface, $\beta$ is an angle formed by the light-entry surface and the normal direction of the first light exit surface, $\pm\gamma$ is an angle of spread of the light after entering the first light-conducting body, and $\theta_{c2}$ is the critical angle of the second light exit surface:

$$\theta_{c2} \leq 90° - \beta - \alpha - \gamma$$

By setting the values of $\alpha$, $\beta$, and $\gamma$ so as to satisfy the foregoing inequality, the light projected onto the second light exit surface is totally reflected, and thus does not escape toward the viewer. As a result, the light from the light source can be projected onto the illuminated object without waste, thus improving the efficiency of use of light from the light source, and unnecessary leakage of light toward the viewer can be prevented, thus enabling a bright illuminated object image.

The above-mentioned front illumination device may also be structured such that a light control means for limiting the spread of light from the light source is provided between the light source and the light-entry surface.

Most of the light from the light source is reflected from the second light exit surface, but in order to decrease the portion of light which is not reflected from the second light exit surface, but escapes from the first light-conducting body, it is preferable to reduce the portion of light striking the second light exit surface at an angle smaller than the critical angle by giving the light from the light source a certain amount of directivity. For this reason, since the foregoing structure provides a light control means for limiting the spread of light from the light source, the amount of light leaking out through the second light exit surface is reduced, thus further improving the efficiency of light use, and preventing bleeding and blurring of the image of the illuminated object. As a result, a front illumination device can be provided which realizes a bright, clear illuminated object image.

The foregoing structure provided with a light-control means may also be structured such that the first and second light exit surfaces are substantially parallel, and such that the following inequality is satisfied, where $\beta$ is an angle formed by the light-entry surface and the normal direction of the first light exit surface, $n_1$ is the refractive index of the first light-conducting body, and $\pm\delta$ is the angle of spread of the light limited by the light-control means:

$$\arcsin((\sin \delta)/n_1) < \beta$$

The left side of the foregoing inequality is the angle of spread $\gamma$ of the light after the light limited by the light-control means enters the first light-conducting body. When the foregoing inequality is satisfied, all of the light entering the first light-conducting body through the light-entry surface is reflected from the second light exit surface, and then is projected onto the first light exit surface at predetermined angles of incidence. Consequently, the portion of light which is projected through the light-entry surface directly to the first light exit surface, and becomes stray light, can be reduced. As a result, a front illumination device can be provided which uses light from the light source efficiently, and which enables a bright illuminated object image.

The foregoing structure provided with a light-control means may also be structured such that the interval between the first and second light exit surfaces grows smaller the greater the distance from the light-entry surface, and such that the following inequality is satisfied, where $\alpha$ is the angle of inclination of the second light exit surface with respect to the first light exit surface, $\beta$ is an angle formed by the light-entry surface and the normal direction of the first light exit surface, $n_1$ is the refractive index of the first light-conducting body, $\pm\delta$ is the angle of spread of the light limited by the light-control means, and $\theta_{c2}$ is the critical angle of the second light exit surface:

$$\arcsin((\sin \delta)/n_1) < \beta + 2\alpha$$

The left side of the foregoing inequality is the angle of spread $\gamma$ of the light after the light limited by the light-control means enters the first light-conducting body. When the foregoing inequality is satisfied, all of the light entering the first light-conducting body through the light-entry surface is reflected from the second light exit surface, and then is projected onto the first light exit surface at predetermined angles of incidence. Consequently, the portion of light which is projected through the light-entry surface directly to the first light exit surface, and becomes stray light, can be reduced. As a result, a front illumination device can be provided which uses light from the light source efficiently, and which enables a bright illuminated object image.

The above-mentioned front illumination device may be further provided with a light-condensing means for concentrating light from the light source onto only the light-entry surface of the first light-conducting body.

With this structure, since loss of the light from the light source is further reduced, the efficiency of use of light from the light source can be further improved, and a brighter front illumination device can be realized.

The above-mentioned front illumination device may also be structured so that a second light-conducting body is further provided outside the first light exit surface of the first light-conducting body; in which the second light-conducting body transmits light projected from the first light exit surface in such a way that light exits the second light-conducting body in a direction closer to the normal direction of the first light exit surface than the direction in which light exits the first light exit surface.

By providing the second light-conducting body, the foregoing structure can bring the light projected by the front illumination device closer to the normal direction of the first light exit surface. By this means, since it is easier for the reflected light from the light projected onto the illuminated object to return to the light exit surface, more of the light from the light source can be efficiently used for illumination, and a front illumination device which enables a brighter illuminated object image can be provided. In addition, since the second light-conducting body brings the exit direction of light projected by the front illumination device closer to the normal direction of the first light exit surface, this device also has the advantage that the viewing angle range when the viewer views the display in reflective mode (when the front illumination device is not illuminated) is substantially the same as that when the front illumination device is illuminated.

The foregoing structure provided with a second light-conducting body may also be structured such that the second light-conducting body is a light-scattering body which scatters light.

With this structure, the exit direction of light projected from the front illumination device can be brought closer to the normal direction of the first light exit surface, and the illuminated object can be illuminated evenly by scattered light. As a result, the light from the light source can be used efficiently for illumination, and a front illumination device can be provided which is brighter, and which realizes a clear illuminated object image which is free of unevenness.

Further, the foregoing structure provided with a light-scattering body may also be structured such that the light-scattering body is a forward-scattering body.

With this structure, since the light-scattering body (second light-conducting body) is a forward-scattering body, which scatters the light projected from the first light-conducting body in the direction it is traveling only, the light from the first light-conducting body is not scattered backward. Consequently, the efficiency of light use can be further improved, and impairment of the image of the illuminated object due to backward scattering can be prevented. As a result, a bright front illumination device can be provided which enables a bright illuminated object image.

Alternatively, the foregoing structure provided with a light-scattering body may also be structured such that the light-scattering body is an anisotropic scattering body, which only scatters light projected at an angle of incidence within a predetermined range, and if at least part of the light projected from the first light-conducting body into the second light-conducting body has angles of incidence falling within this predetermined range.

With this structure, since light projected from the first light-conducting body has angles of incidence within the predetermined range within which the light-scattering body (second light-conducting body) scatters light, the anisotropic scattering body does not act on light, such as that traveling toward the viewer, having an angle of incidence outside the predetermined range, and accordingly deterioration of display quality due to unnecessary scattering can be prevented. Further, the light projected from the first light-conducting body can be scattered efficiently, thus further improving the efficiency of light use. As a result, a bright front illumination device can be provided which enables a bright illuminated object image.

Further, the structure provided with a second light-conducting body may also be structured such that the second light-conducting body is a diffracting element which diffracts light.

Further, it is preferable if this structure is one in which the diffracting element only diffracts light having an angle of incidence within a predetermined range, and if at least part of the light projected from the first light-conducting body into the diffracting element has angles of incidence falling within this predetermined range.

With this structure, since light projected from the first light-conducting body has angles of incidence within the predetermined range within which the diffracting element (second light-conducting body) diffracts light, the diffracting element does not act on light, such as that traveling toward the viewer, having an angle of incidence outside the predetermined range, and accordingly deterioration of display quality due to unnecessary diffracting can be prevented. Further, the light projected from the first light-conducting body can be used efficiently, thus further improving the efficiency of light use. As a result, a bright front illumination device can be provided which enables a bright illuminated object image.

Alternatively, the structure in which the second light-conducting body is a diffracting element may be structured such that the diffracting element is a hologram.

With a hologram, outgoing light can be precisely regulated to within a specific range more easily than with an anisotropic scattering plate, etc. By using a hologram as the second light-conducting body in this way, the direction of light projected from the first light-conducting body can be precisely regulated to within a predetermined range, and a front illumination device with superior directivity can be provided.

In the above-mentioned structure provided with a second light-conducting body, it is preferable if a gap between the first and second light-conducting bodies is filled with a filler agent for alleviating differences in refractive indices at the optical interfaces between the two light-conducting bodies.

In comparison with a structure in which the gap between the two light-conducting bodies is filled with air, the foregoing structure is able to reduce attenuation of the light due to refraction at the optical interfaces between the first and second light-conducting bodies. As a result, the efficiency of use of light from the light source can be further improved, and a front illumination device which is a brighter flat light source can be realized. If the refractive index of the filler agent is equal to that of at least one of the light-conducting bodies, this structure can be made even more effective, since the number of optical interfaces between the first and second light-conducting bodies is reduced.

Further, the foregoing structure provided with a filler agent may also be structured such that the first and second light exit surfaces of the first light-conducting body are substantially parallel, and such that the following inequality is satisfied, where $\beta$ is an angle formed by the light-entry surface and the normal direction of the first light exit surface of the first light-conducting body, $\pm\gamma$ is an angle of spread of the light after entering the first light-conducting body, and $\theta_{c1}$ is the critical angle of the first light exit surface of the first light-conducting body:

$$\theta_{c1} > 90° - \beta + \gamma$$

When the foregoing inequality is satisfied, light guided to the first light exit surface passes through without being reflected therefrom. Consequently, stray light traveling toward the second light exit surface, i.e., toward the viewer, can be reduced. As a result, a front illumination device can be provided which enables a bright illuminated object image.

Alternatively, the foregoing structure provided with a filler agent may also be structured such that the interval between the first and second light exit surfaces of the first light-conducting body grows smaller the greater the distance from the light-entry surface, and such that the following inequality is satisfied, where $\alpha$ is the angle of inclination, in the first light-conducting body, of the second light exit surface with respect to the first light exit surface, $\beta$ is an angle formed by the light-entry surface and the normal direction of the first light exit surface of the first light-conducting body, $\pm\gamma$ is an angle of spread of the light after entering the first light-conducting body, and $\theta_{c1}$ is the critical angle of the first light exit surface of the first light-conducting body:

$$\theta_{c1} > 90° - \beta - 2\alpha + \gamma$$

When the foregoing inequality is satisfied, light guided to the first light exit surface passes through without being reflected therefrom. Consequently, stray light traveling toward the second light exit surface, i.e., toward the viewer, can be reduced. As a result, a front illumination device can be provided which enables a bright illuminated object image.

In order to attain the object mentioned above, a reflection-type liquid crystal display device according to the present invention includes a reflection-type liquid crystal element having a reflective plate, and is provided with the above-mentioned front illumination device according to the present invention mounted on the front of the reflection-type liquid crystal element.

With the foregoing structure, the device can be used with the front illumination device off when there is sufficient surrounding light, such as outdoors during the day, and with the front illumination device illuminated when surrounding light is insufficient. As a result, a reflection-type liquid crystal display device can be provided which is able to realize high-quality display which is always bright, regardless of the surrounding environment.

Here, it is preferable if a gap between the reflection-type liquid crystal element and the front illumination device is filled with a filler agent for alleviating differences in refractive indices at optical interfaces between the reflection-type liquid crystal element and the front illumination device.

In comparison with a structure in which the gap between the reflection-type liquid crystal element and the front illumination device is filled with air, the foregoing structure is able to reduce attenuation of the light due to reflection at the optical interfaces between the reflection-type liquid crystal element and the front illumination device. As a result, the efficiency of use of light from the light source can be further improved, and a brighter front illumination device can be realized.

Further, it is preferable, in the reflection-type liquid crystal display device provided with a filler agent, if the front illumination device is structured such that the first and second light exit surfaces of the first light-conducting body are substantially parallel, and such that the following inequality is satisfied, where $\beta$ is an angle formed by the light-entry surface and the normal direction of the first light exit surface of the first light-conducting body of the front illumination device, $\pm\gamma$ is an angle of spread of the light after entering the first light-conducting body, and $\theta_{c1}$ is the critical angle of the first light exit surface of the first light-conducting body:

$$\theta_{c1} > 90° - \beta + \gamma$$

When the foregoing inequality is satisfied, light guided to the first light exit surface is not reflected therefrom, but is projected toward the liquid crystal element. Consequently, the efficiency of use of light from the light source can be improved, and stray light traveling toward the second light exit surface, i.e., toward the viewer, can be reduced. As a result, a reflection-type liquid crystal display device can be provided which is bright and which has superior display quality.

Alternatively, in the reflection-type liquid crystal display device provided with a filler agent, the front illumination device may also be structured such that the interval between the first and second light exit surfaces of the first light-conducting body grows smaller the greater the distance from the light-entry surface, and such that the following inequality is satisfied, where $\alpha$ is the angle of inclination, in the first light-conducting body, of the second light exit surface with respect to the first light exit surface, $\beta$ is an angle formed by the light-entry surface and the normal direction of the first light exit surface of the first light-conducting body, $\pm\gamma$ is an angle of spread of the light after entering the first light-conducting body, and $\theta_{c1}$ is the critical angle of the first light exit surface of the first light-conducting body:

$$\theta_{c1} > 90° - \beta - 2\alpha + \gamma$$

When the foregoing inequality is satisfied, light guided to the first light exit surface is not reflected therefrom, but is projected toward the liquid crystal element. Consequently, efficiency of use of light from the light source can be improved, and stray light traveling toward the second light exit surface, i.e., toward the viewer, can be reduced. As a result, a reflection-type liquid crystal display device can be provided which is bright and which has superior display quality.

The foregoing reflection-type liquid crystal display device may be further provided with a light-condensing means for concentrating light from the light source onto only the light-entry surface of the first light-conducting body.

With this structure, since loss of the light from the light source is further reduced, the efficiency of use of light from the light source can be further improved, and a reflection-type liquid crystal display device with brighter display can be provided. Further, projection of light from the light source directly to the liquid crystal element or other members of different refractive index can be prevented, and thus stray light, light components scattered toward the viewer, etc. can be reduced. As a result, a reflection-type liquid crystal display device can be provided which is capable of bright image display.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2(a) is an explanatory drawing showing the behavior of light in a light-conducting body of a front-light included in the reflection-type LCD shown in FIG. 1, and FIG. 2(b) is an explanatory diagram showing, for purposes of comparison to the foregoing light-conducting body, the behavior of light in a structure having a light-entry surface which is perpendicular to a first light exit surface.

DESCRIPTION OF THE EMBODIMENTS

First Embodiment

The following will explain one embodiment of the present invention with reference to FIGS. 1 through 8.

Figure 1:
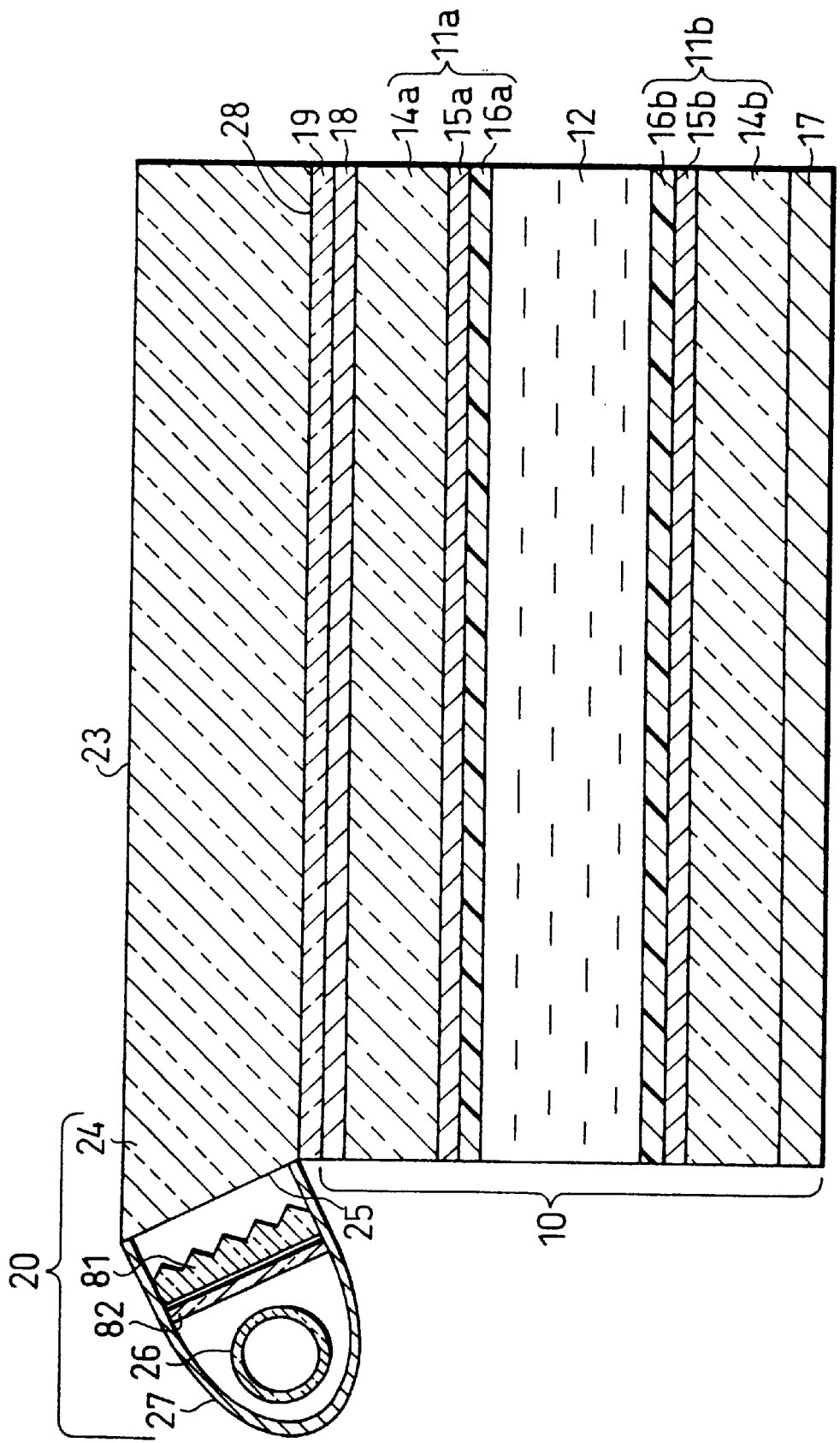
FIG. 1 is a cross-sectional drawing showing the structure of a reflection-type LCD according to one embodiment of the present invention.

As shown in FIG. 1, a reflection-type LCD according to the present embodiment includes a front-light 20 (front illumination device) provided on the front of a reflection-type liquid crystal cell 10 (reflection-type liquid crystal element).

The front-light 20 is chiefly made up of a light source 26 and a light-conducting body 24. The light source 26 is a linear light source such as a fluorescent tube, and is provided along a side (light-entry surface 25) of the light-conducting body 24. The light-conducting body 24 is provided such that an interface 28 facing the liquid crystal cell 10 (first light exit surface) and an interface 23 (second light exit surface) opposite the interface 28 are both flat. Further, the interfaces 23 and 28 are provided parallel to one another.

The light-entry surface 25, which admits light from the light source 26, is provided on an incline so as to form an obtuse angle with the interface 28. Between the light source 26 and the light-entry surface 25 of the light-conducting body 24 are provided a prism sheet 81 and a diffusion plate 82, which collectively serve as light-control means for limiting the spread of light entering the light-entry surface 25 from the light source 26.

The light-conducting body 24 may be formed by injection molding using a material such as PMMA (polymethylmethacrylate). Specifically, the light-conducting body 24 in the present embodiment was provided with a thickness of 5 mm, a length of 40 mm, and a width of 40 mm. The angle β of the light-entry surface 25 with respect to the normal direction of the interface 28 was 22°. In other words, the angle formed by the light-entry surface 25 and the interface 28 was 112°. Incidentally, it is preferable to perform optical polishing on the light-entry surface 25 and the interface 23.

Next, the structure and method of manufacture of the liquid crystal cell 10 will be explained.

As shown in FIG. 1, the liquid crystal cell 10 is basically composed of two electrode substrates 11a and 11b, with a liquid crystal layer 12 filling a gap therebetween. In the electrode substrate 11a, transparent electrodes 15a are provided on a glass substrate 14a which has transparency, and the transparent electrodes 15a are covered with a liquid crystal alignment film 16a.

The glass substrate 14a may be realized by, for example, a glass plate made by Corning Co. (product 7059). The transparent electrodes 15a are made, for example, of ITO (Indium Tin Oxide). The liquid crystal alignment film 16a may be prepared by, for example, using a spin coater to form a coat of an alignment film material made by Japan Synthetic Rubber Co. (product AL-4552) on the glass substrate 14a after the transparent electrodes 15a have been provided thereon, and then performing rubbing as alignment processing.

The electrode substrate 11b is prepared in the same manner as the electrode substrate 11a, by layering transparent electrodes 15b and a liquid crystal alignment film 16b, in that order, on a glass substrate 14b. The electrode substrates 11a and 11b may, as necessary, be provided with insulating films, etc.

The electrode substrates 11a and 11b are combined together, using an adhesive, such that the liquid crystal alignment films 16a and 16b are opposite one another, and so that their rubbing directions are parallel but opposite in direction (so-called antiparallel). By previously dispersing glass bead spacers 4.5 μm in diameter between the electrode substrates 11a and 11b, a gap of uniform interval is provided.

Then, by introducing liquid crystal into this gap by vacuum deaeration, a liquid crystal layer 12 is provided. As material for the liquid crystal layer 12, the liquid crystal made by Merck Co. (product ZLI-3926), for example, may be used. Incidentally, the Δn of this liquid crystal material is 0.2030. However, the liquid crystal material is not limited to this, and various types of liquid crystal may be used.

Further, as a reflective plate 17, an aluminum plate which has undergone hairline processing is attached to the outside of the glass substrate 14b using, for example, an epoxy-based adhesive, and a polarizing plate 18, set so that its polarization axis is 45° from the alignment direction of the liquid crystal 12, is installed on the outside of the glass substrate 14a. A gap between the glass substrate 14a and the polarizing plate 18 is filled with a filler agent (not shown) which matches the refractive indices of these two members.

The reflection-type liquid crystal cell 10 is manufactured by means of the foregoing process. By combining this liquid crystal cell 10 with the front-light 20 in the following manner, a reflection-type LCD with front illumination device can be manufactured. First, the light-conducting body 24 is layered on the polarizing plate 18 of the liquid crystal cell 10. A gap between the polarizing plate 18 of the liquid crystal cell 10 and the light-conducting body 24 is filled with a filler agent 19, which matches the refractive indices of these two members.

The filler agent 19 alleviates the differences in refractive index at the optical interfaces between the polarizing plate 18 and the light-conducting body 24, thus resolving problems such as deterioration of display quality due to interference of light or reflection at the optical interfaces. Further, it is preferable to use for the filler agent 19 a material having the same refractive index as the light-conducting body 24, since by this means the number of optical interfaces between the liquid crystal cell 10 and the light-conducting body 24 can be reduced. As the filler agent 19, materials such as UV-hardened resin or methyl salicylate may be used.

Next, the prism sheet 81 and the diffusion plate 82 are provided, in that order, opposite the light-entry surface 25 of the light-conducting body 24, and then, as the light source 26, a fluorescent tube, for example, is installed. Then these three members are enclosed by the reflecting mirror 27. The reflecting mirror 27 functions as a light condensing means for concentrating light from the light source 26 onto only the light-entry surface 25. For the reflecting mirror 27, a material such as aluminum tape may be used.

By means of the foregoing process, a reflection-type LCD provided with a front-light 20 as auxiliary illumination is completed. This reflection-type LCD can be used in illuminated mode, with the front-light 20 illuminated, when surrounding light is insufficient, and in reflective mode, with the front-light 20 off, when sufficient surrounding light can be obtained.

In the foregoing reflection-type LCD, the light-conducting body 24 has a refractive index roughly equivalent to that of the glass substrate 14a, and there are no open spaces (air layers) from the light-conducting body 24 to the glass substrate 14a. For these reasons, even when this reflection-type LCD is used in reflective mode, with the front-light 20 turned off, the light-conducting body 24 does not have a detrimental influence on display.

The following will explain, with reference to FIGS. 2(a) and 2(b), the effect of providing the front-light 20 with a light-entry surface 25 which inclines with respect to the normal direction of the interface 28. FIG. 2(a) shows the structure of the light-conducting body 24 in a cross-section taken perpendicular to the light-entry surface 25 and to the interface 28. FIG. 2(b) shows, for purposes of comparison with the light-conducting body 24, the structure of a light-conducting body 184 in a cross-section taken in the same direction. The light-conducting body 184 has the same thickness as the light-conducting body 24, and has interfaces 183 and 188 which are parallel to one another, and a light-entry surface 185 perpendicular to the interfaces 183 and 185.

First, as is clear from a comparison of FIGS. 2(a) and 2(b), in the light-conducting body 24 according to the present embodiment, since the light-entry surface 25 inclines with respect to the normal direction of the interface 28, the area of the light-entry surface 25 is larger than that of the light-entry surface 185, although the respective light-conducting bodies have the same thickness. In other words, in the light-conducting body 24 according to the present embodiment, the area of the light-entry surface 25 can be increased without increasing the greatest thickness of the light-conducting body 24, and thus more light from the light source 26 can be admitted. By this means, the efficiency of use of light from the light source is increased.

Further, with the structure shown in FIG. 2(b), light, among that projected from the light source through the light-entry surface 185, which travels perpendicular to the light-entry surface 185, escapes through a surface 186 opposite the light-entry surface 185. In other words, with the structure shown in FIG. 2(b), there is great loss of the light from the light source. In contrast, in the light-conducting body 24, as shown in FIG. 2(a), the light-entry surface 25 forms an obtuse angle with the interface 28, and thus light traveling perpendicular to the light-entry surface 25 strikes the interface 23 with an angle of incidence of $\theta_2$. Accordingly, in the light-conducting body 24, there is little loss of the portion of light traveling perpendicular to the light-entry surface 25, and thus the efficiency of use of light from the light source is increased.

Figure 3:
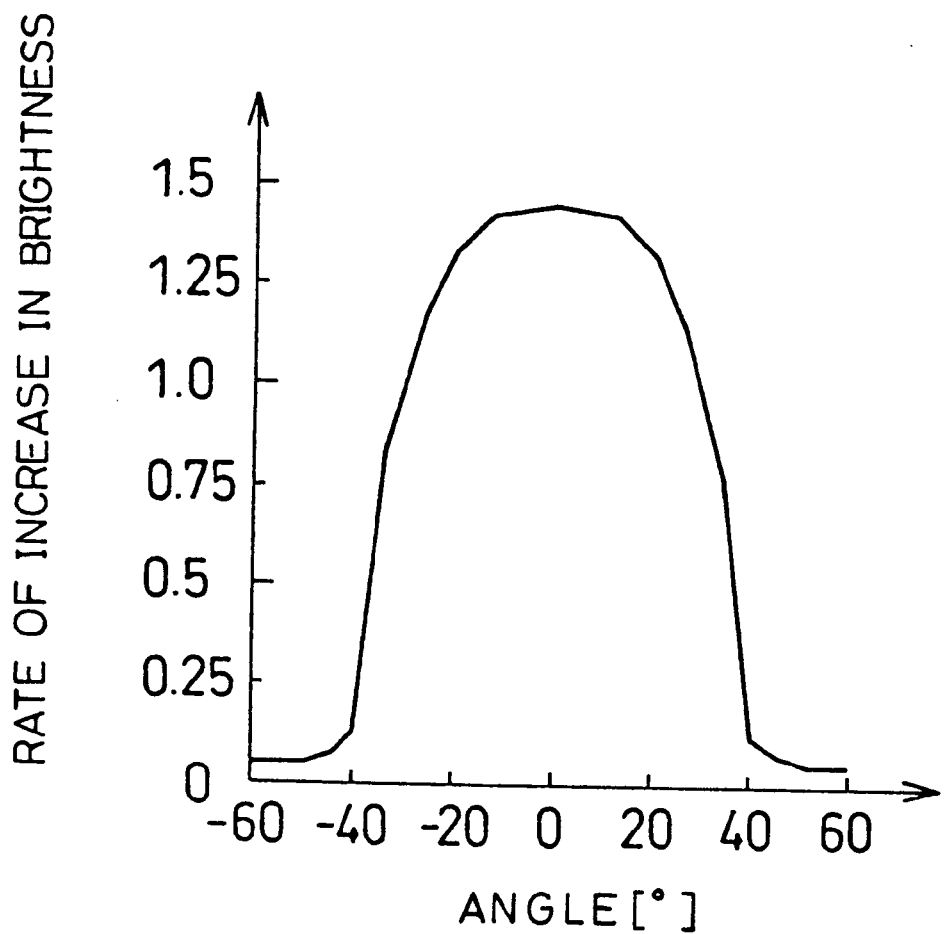
FIG. 3 is a graph showing light concentrating characteristics of a prism sheet included in the front-light of the reflection-type LCD shown in FIG. 1.

The following will explain the diffusion plate 82 and the prism sheet 81, which collectively act as light-control means. Light emitted by the light source 26 is first diffused by the diffusion plate 82, and then projected to the prism sheet 81. The function of the prism sheet is to limit the spread of the diffused light from the diffusion plate 82 to within a predetermined range of angles. In the present embodiment, since the apex angle of the prism sheet 81 is 100°, the diffused light is condensed into a range of approximately ±40°, as shown in FIG. 3. When the light condensed into a range of approximately ±40° enters the light-conducting body 24, it is further condensed by the refraction of the light-entry surface 25, and becomes light with a range of spread of approximately ±25.4°.

Figure 4:
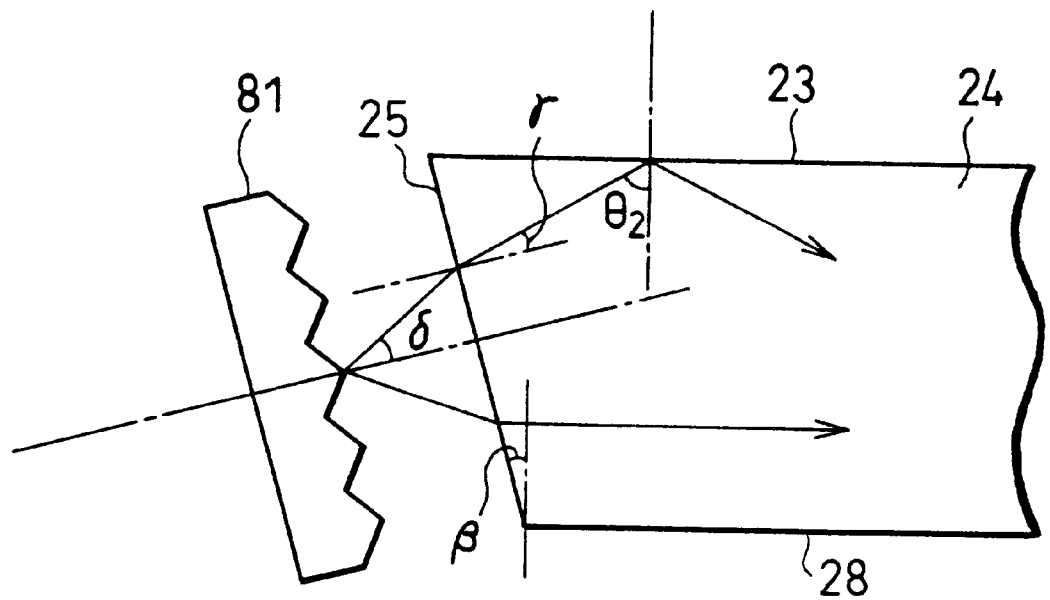
FIG. 4 is an explanatory drawing showing the behavior of light concentrated by the foregoing prism sheet after it enters a light-conducting body.
Figure 5:
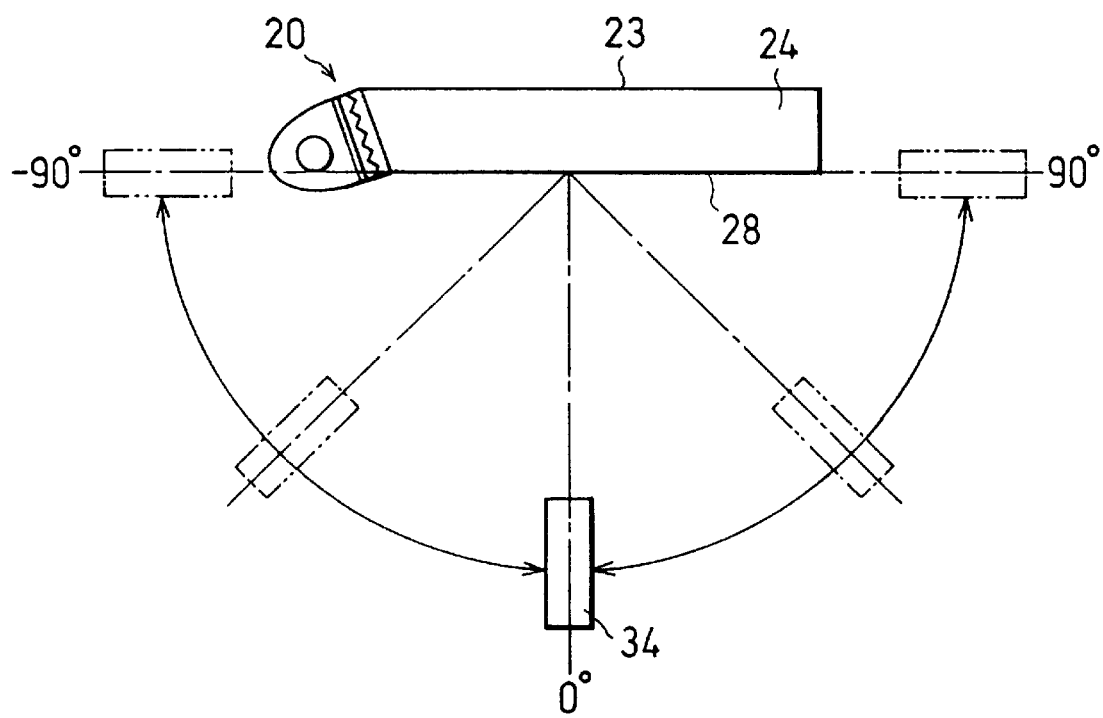
FIG. 5 is an explanatory drawing showing a measurement system for measuring the intensity of illumination in the foregoing front-light.

As a result, as shown in FIG. 4, if β is the angle of the light-entry surface 25 with respect to the normal direction of the interface 23, and ±γ is the angle of spread of the light from the prism sheet 81 after entering the light-entry surface 25, then the possible range of the light's angle of incidence $\theta_2$ at the interface 23 of the light-conducting body 24 is as shown by:

$$90°-\beta-\gamma \leq \theta_2 \leq 90°-\beta+\gamma$$

In addition, when ±δ is the angle of spread of the light from the light source after leaving the diffusion plate 82 and the prism sheet 81, and $n_1$ is the refractive index of the light-conducting body 24, then the following is also true:

$$\gamma = \arcsin((\sin \delta)/n_1)$$

Here, given that the refractive index of the PMMA composing the light-conducting body 24 is approximately 1.5, the critical angle $\theta_{c2}$ of the interface 23 is approximately 42°. In other words, light striking the interface 23 with an angle of incidence $\theta_2$ of less than 42° leaks through the interface 23. However, in the present embodiment, as discussed above, $\beta=22°$, and $\gamma=\pm25.4°$, and accordingly the angle of incidence $\theta_2$ at the interface 23 falls within the range within which light is totally reflected therefrom. In other words, in the present embodiment, there is no leakage of light from the interface 23 of the light-conducting body 24.

Further, the possible range of the light's angle of incidence $\theta_1$ at the interface 28 of the light-conducting body 24 is as shown by:

$$90°-\beta-\gamma \leq \theta_1 \leq 90°-\beta-\gamma$$

In order to ensure that the front-light 20 functions well as a front illumination device, it is preferable if the following two conditions are met:

(i) light projected onto the interface 23 is totally reflected, i.e., $\theta_2 \geq \theta_{c2}$; and (ii) light projected onto the interface 28 is not reflected, i.e., $\theta_1 < \theta_{c1}$;

where $\theta_{c1}$ is the critical angle of the interface 28, and $\theta_{c2}$ is the critical angle of the interface 23.

From the above, it can be seen that it is preferable if the following are satisfied:

$$\theta_{c2} \leq 90°-\beta-\gamma; \text{ and}$$

$$\theta_{c1} > 90°-\beta+\gamma$$

Further, when $$\gamma = \arcsin((\sin \delta)/n_1) < \beta$$

is also satisfied, the entirety of the light entering through the light-entry surface 25 is first reflected from the interface 23, and then passes through the interface 28 at predetermined angles of incidence. Consequently, light from the light source can be prevented from entering the liquid crystal cell 10 directly from the light-entry surface 25.

The following will explain the results of measurement of the intensity of illumination of the front-light 20. In order to measure the intensity of illumination of the front-light 20, a measurement system like that shown in FIG. 5 was used. With the normal direction of the interface 28 of the front-light 20 being 0°, light intensity was measured within a range from 0° through ±90° using a sensor 34. This measurement was made in a container filled with a matching agent having a refractive index equal to that of the light-conducting body 24 (in an oil bath, for example).

Figure 6:
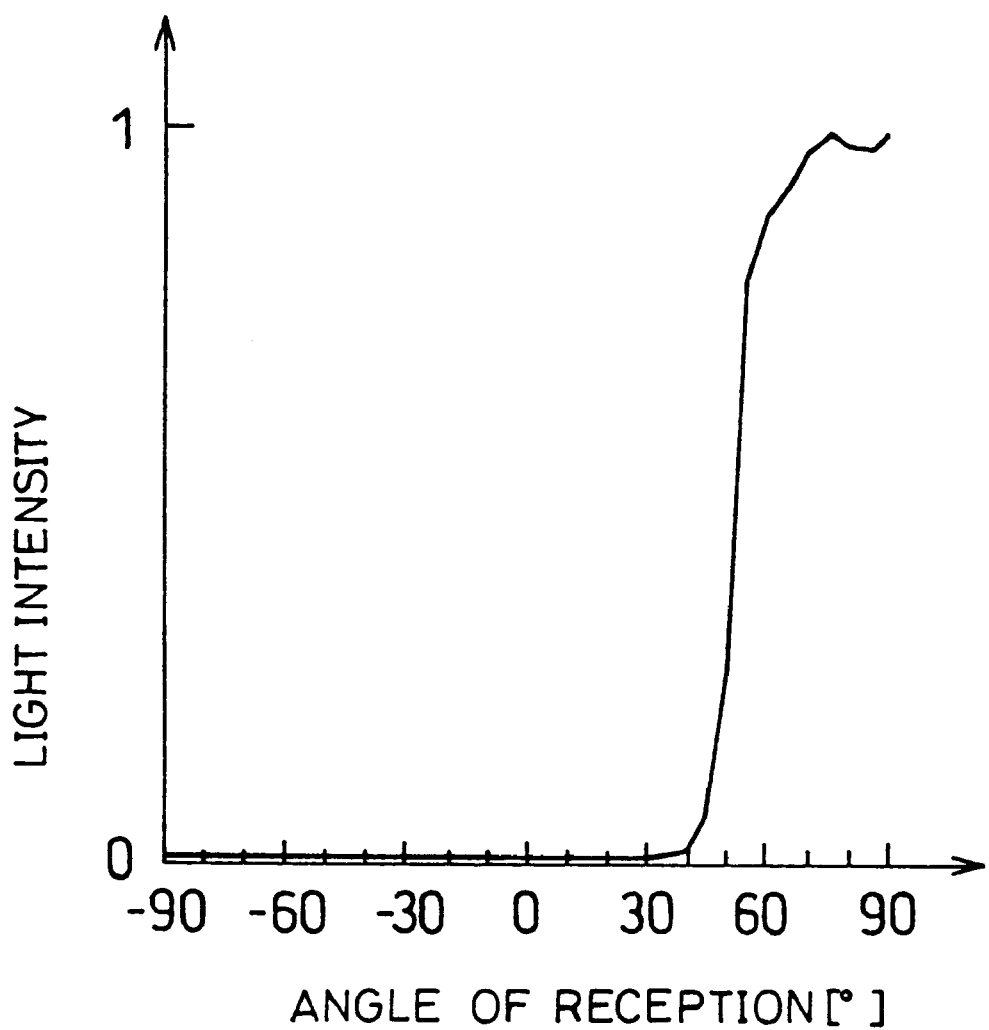
FIG. 6 is a graph showing the intensity of illumination measured by the measurement system shown in FIG. 5.

The measurement results are shown in FIG. 6. As is clear from FIG. 6, in the front-light 20, the effect of the light-conducting body 24 enables light projected into the light-conducting body 24 from the light source 26 to be projected toward the liquid crystal cell 10 at angles of roughly 40° to 90°. Thus the front-light 20 can be used as auxiliary illumination for the liquid crystal cell 10.

The reflection-type LCD according to the present embodiment has the advantage of being capable of display which is brighter than that of self-illuminating displays such as transmission-type LCDs, CRTs, and PDPs.

Figure 7A:
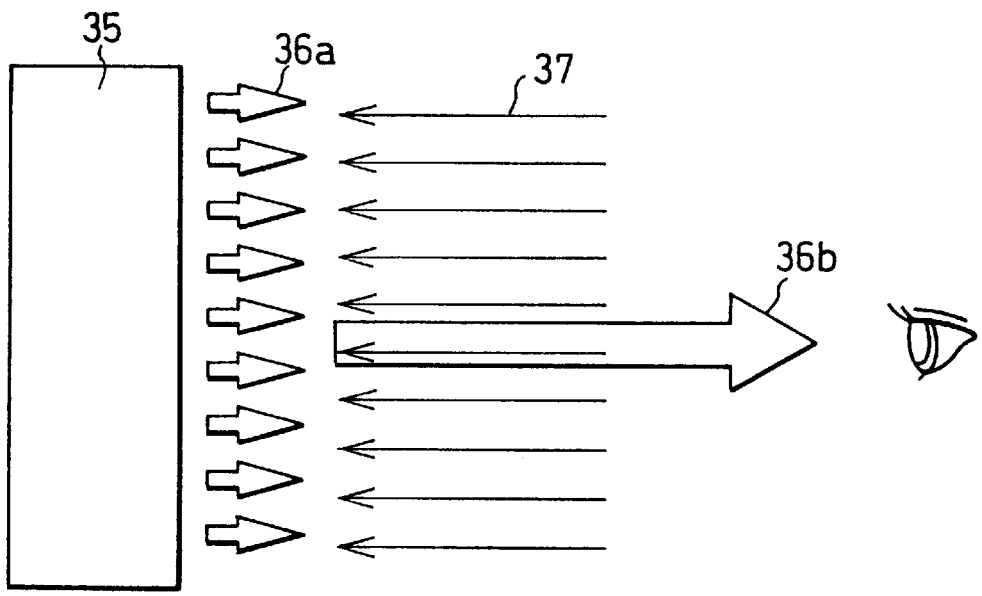
FIG. 7(a) is a schematic drawing showing the relationship between light projected from a light-emitting display and surrounding light.

To explain: as shown in FIG. 7(a), light 36a from a self-illuminating display 35 is projected in a direction opposite that of surrounding light 37. For this reason, the light viewed by the viewer is the portion 36b remaining after subtracting the surrounding light 37 from the light 36a.

Figure 7B:
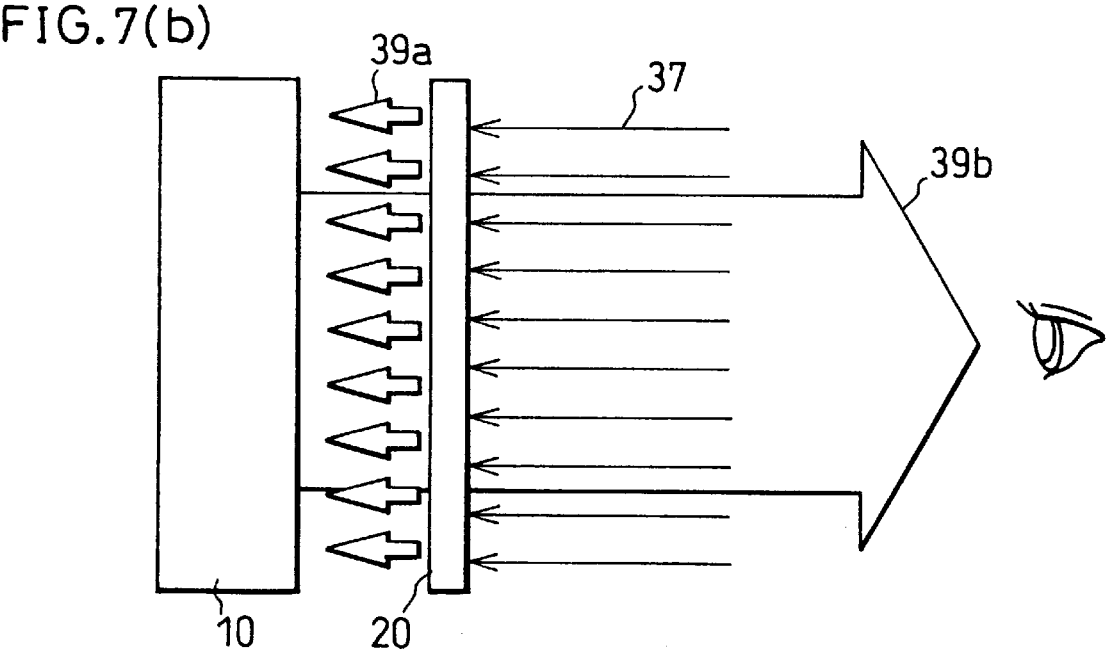
FIG. 7(b) is a schematic drawing showing the relationship between light projected from the foregoing reflection-type LCD and surrounding light.

In contrast, when the reflection-type LCD according to the present embodiment is used in illuminated mode, as shown in FIG. 7(b), auxiliary light 39a from the front-light 20 and surrounding light 37 are both reflected from the reflective plate (not shown) of the liquid crystal cell 10, and the portion 39b viewed by the viewer is the total of the auxiliary light 39a plus the surrounding light 37. For this reason, a brighter display can be realized, not only in dark areas but also in bright areas such as outdoors during the day.

Figure 8A:
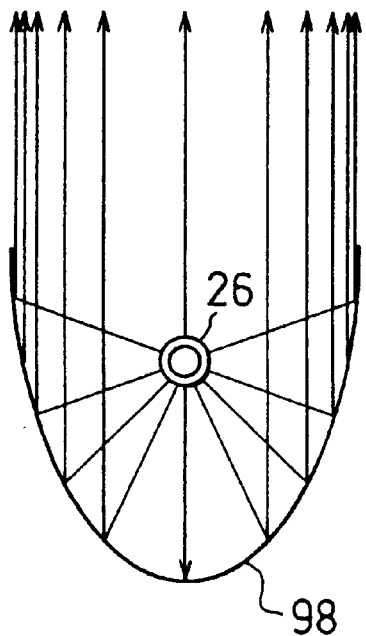
FIGS. 8(a) and 8(b) are explanatory drawings showing alternative structures which may be used, instead of a prism sheet and a diffusion plate, to limit the spread of entering light.
Figure 8B:
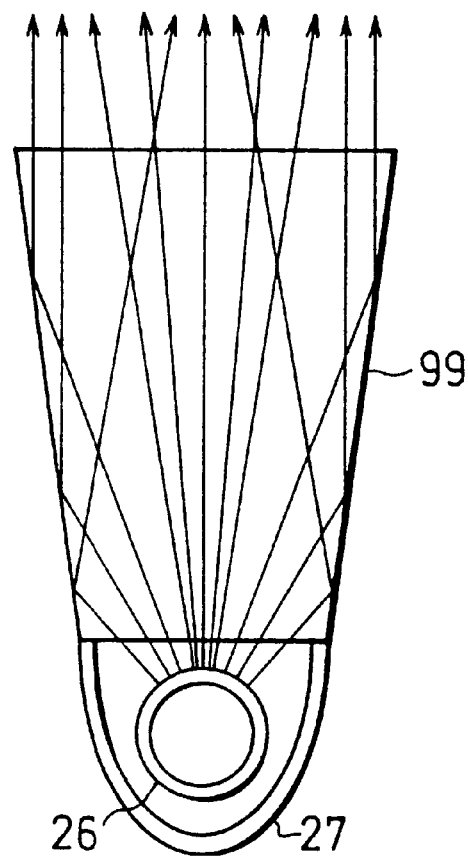

In the present embodiment, the diffusion plate 82 and the prism sheet 81 were used as light control means for limiting the spread of light from the light source, but, as long as the same effect can be obtained, there is no need to be limited to this. For example, a collimator may be used. Again, as shown in FIG. 8(a), the same effect may be obtained with a structure in which the light source 26 is enclosed by an ellipsoidal mirror 98, at the focal point of which the light source 26 is placed. Further, as discussed in SID DIGEST (1995) p.375, a light pipe 99 like that shown in FIG. 8(b) may also be used to control the spread of light from the light source 26.

Second Embodiment

The following will explain another embodiment of the present invention with reference to FIGS. 9 through 14. Structures having the same functions as structures explained in the first embodiment above will be given the same reference symbols, and explanation thereof will be omitted.

Figure 9:
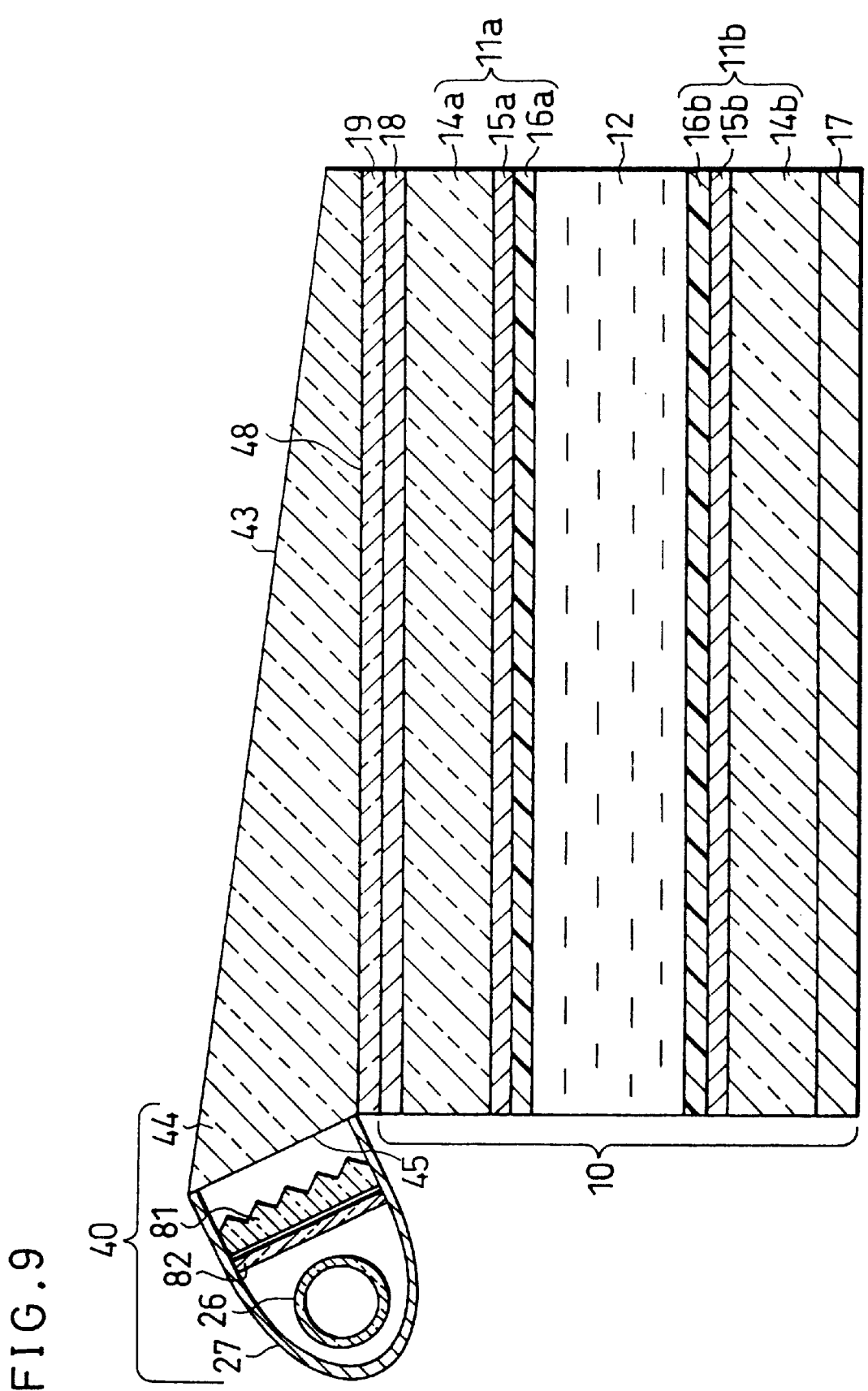
FIG. 9 is a cross-sectional drawing showing the structure of a reflection-type LCD according to another embodiment of the present invention.

As shown in FIG. 9, in a reflection-type LCD according to the present embodiment, a front-light 40, which includes a light-conducting body 44 whose thickness decreases the greater the distance from the light source 26, is provided on the front of the liquid crystal cell 10 instead of the front-light 20 explained in the first embodiment above, which included a light-conducting body 24 of uniform thickness.

The light-conducting body 44 has an interface 48 facing the liquid crystal cell 10, an interface 43 opposite the interface 48, and a light-entry surface 45 which forms an obtuse angle with the interface 48, and which admits light from the light source 26. The interfaces 43 and 48 are provided such that the interval therebetween grows smaller the greater the distance from the light-entry surface 45.

The light-conducting body 44 may be formed by injection molding using a material such as PMMA (polymethylmethacrylate). Specifically, the light-conducting body 44 was provided with a maximum thickness (the length of a vertical line from the end of the interface 43 nearest the light source 26 to the plane including the interface 48) of 6 mm, a minimum thickness of 1 mm, a length of 40 mm, and a width of 40 mm. The angle $\beta$ of the light-entry surface 45 with respect to the normal direction of the interface 48 was 14°. Again, the angle of inclination $\alpha$ of the interface 43 with respect to the interface 48 (the angle formed by the interface 43 and a plane parallel to the interface 48) was 7.13°. Incidentally, it is preferable to perform optical polishing on the light-entry surface 45 and the interface 43.

The light-conducting body 44 is layered on the front of the liquid crystal cell 10. In the liquid crystal cell 10, as in the first embodiment above, a gap between the polarizing plate 18 and the glass substrate 14a of the electrode substrate 11a is filled with a filler agent (not shown). Further, a gap between the polarizing plate 18 and the light-conducting body 44 is filled with a filler agent 19, which matches the refractive indices of these two members.

The filler agent 19 alleviates the differences in refractive index at the optical interfaces between the polarizing plate 18 and the light-conducting body 44, thus resolving problems such as deterioration of display quality due to interference of light or reflection at the optical interfaces. Further, it is preferable to use for the filler agent 19 a material having the same refractive index as the light-conducting body 44, since by this means the number of optical interfaces between the liquid crystal cell 10 and the light-conducting body 44 can be reduced.

The reflection-type LCD according to the present embodiment can be used in illuminated mode, with the front-light 40 illuminated, when surrounding light is insufficient, and in reflective mode, with the front-light 40 off, when sufficient surrounding light can be obtained.

In the foregoing reflection-type LCD, the light-conducting body 44 has a refractive index roughly equivalent to that of the glass substrate 14a, and there are no open spaces (air layers) from the light-conducting body 44 to the glass substrate 14a. For these reasons, even when this reflection-type LCD is used in reflective mode, with the front-light 40 turned off, the light-conducting body 44 does not have a detrimental influence on display.

Figure 10A:
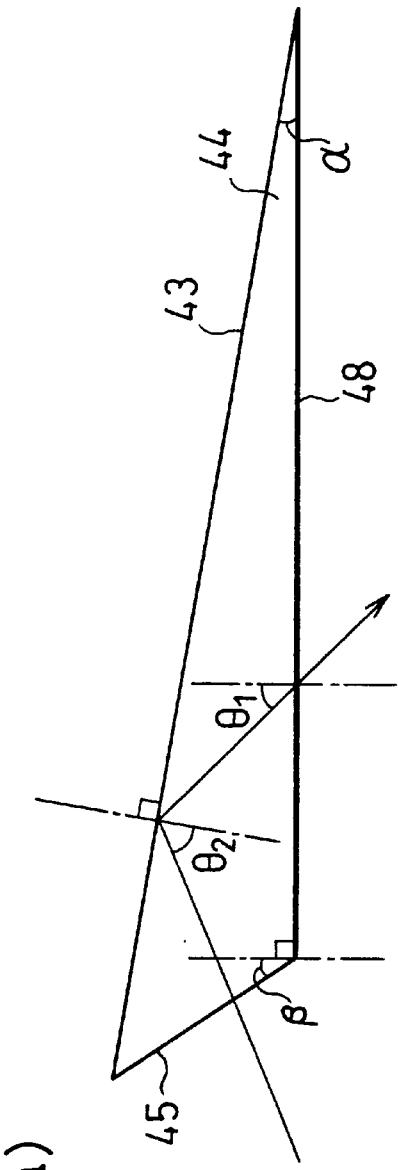
FIG. 10(a) is an explanatory drawing showing the behavior of light in a light-conducting body included in the reflection-type LCD shown in FIG. 9.
Figure 10B:
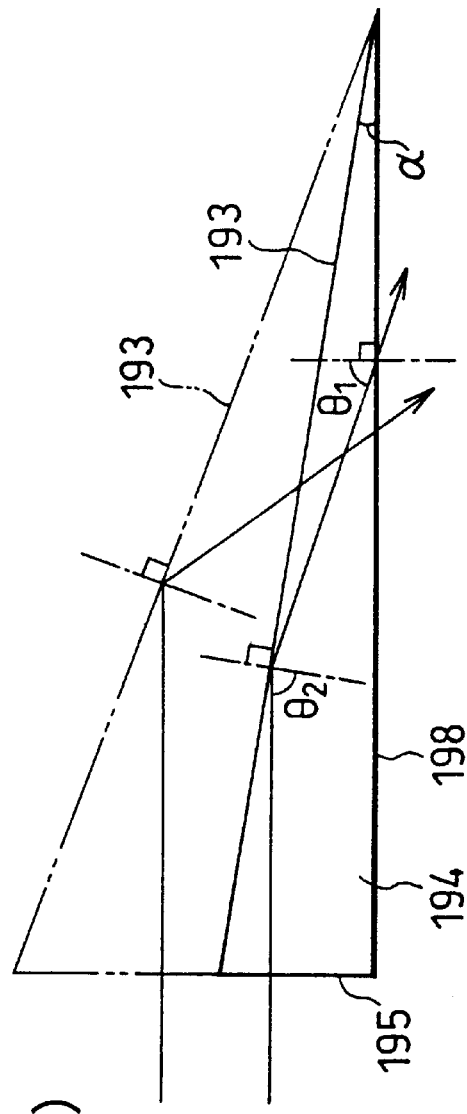
FIG. 10(b) is an explanatory drawing showing, for purposes of comparison, the behavior of light in another light-conducting body.

The following will explain, with reference to FIGS. 10(a) and 10(b), the effect of providing the front-light 40 with a light-entry surface 45 which inclines with respect to the normal direction of the interface 48.

As shown in FIG. 10(b), with a hypothetical light-conducting body 194 having a light-entry surface 195 which is perpendicular to an interface 198, light entering perpendicular to the light-entry surface 195 has an angle of incidence $\theta_2$ at the interface 193 of:

$$\theta_2 = 90° - \alpha$$

If this light is reflected from the interface 193, it will then have an angle of incidence $\theta_1$ at the interface 198 of:

$$\theta_1 = \theta_2 - \alpha = 90° - 2\alpha$$

In other words, in order to decrease the angle of incidence $\theta_1$ of light projected toward the liquid crystal cell 10 (in order to bring it closer to perpendicular), it is necessary to increase the value of the angle of inclination $\alpha$ of the interface 193 with respect to the interface 198, as shown by the two-dot-and-dash lines in FIG. 10(b). However, it is not preferable to increase the value of $\alpha$, since this increases the thickness of the light-conducting body.

In contrast, in the light-conducting body 44 according to the present embodiment, as shown in FIG. 10(a), the light-entry surface 45 inclines at an angle of $\beta$ with respect to the normal direction of the interface 48, and thus light entering perpendicular to the light-entry surface 45 has an angle of incidence $\theta_2$ at the interface 43 of:

$$\theta_2 = 90° - \alpha - \beta$$

If this light is reflected from the interface 43, it will then have an angle of incidence $\theta_1$ at the interface 48 of:

$$\theta_1 = 90° - 2\alpha - \beta$$

Accordingly, the angle of incidence $\theta_1$ of light entering the liquid crystal cell 10 can be decreased, and the light projected toward the liquid crystal cell 10 brought closer to perpendicular, without increasing the value of $\alpha$.

Further, in the light-conducting body 44, as in the first embodiment above, since the light-entry surface 45 inclines with respect to the normal direction of the interface 48, the area of the light-entry surface 45 can be increased. In other words, a large light-entry surface 45 can be provided without increasing the greatest thickness of the light-conducting body 44, and thus more light from the light source can be admitted. By this means, the efficiency of use of light from the light source is increased.

The following will explain the effect of providing the light-conducting body 44 according to the present embodiment with a light-entry surface 45 which forms an obtuse angle with the interface 48.

Figure 11A:
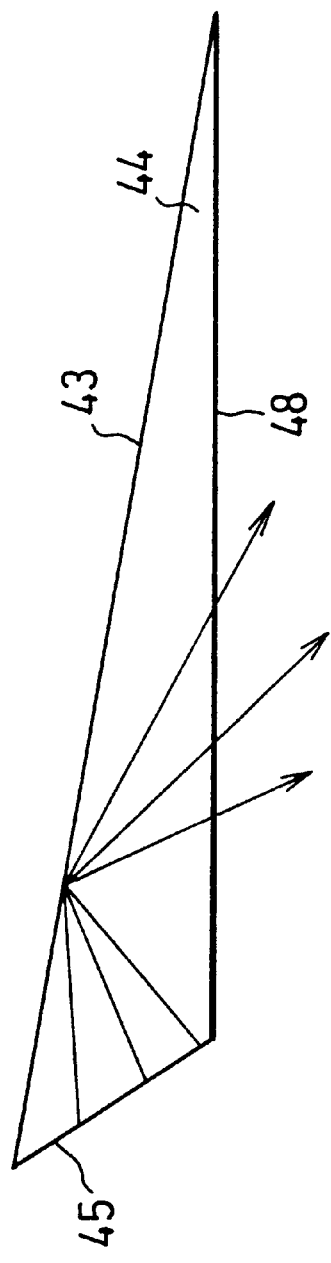
FIG. 11(a) is an explanatory drawing showing the behavior of light in a light-conducting body included in the reflection-type LCD shown in FIG. 9.
Figure 11B:
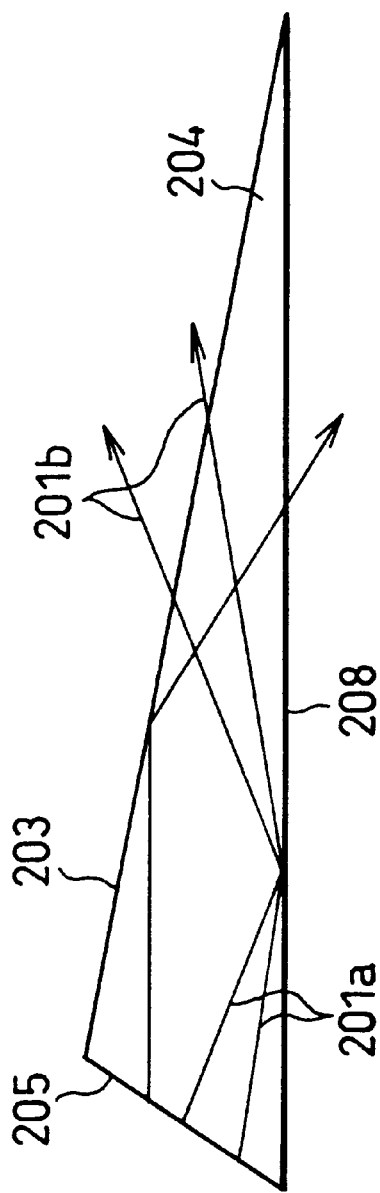
FIG. 11(b) is an explanatory drawing showing, for purposes of comparison, the behavior of light in another light-conducting body.

First, with reference to FIG. 11(b), the following will explain, for comparative purposes, the behavior of light in a light-conducting body 204 having a light-entry surface 205 which forms an acute angle with an interface 208. In this case, as shown in FIG. 11(b), a portion 201a of the light from the light-entry surface 205 is projected directly to the interface 208. The portion 201a is projected onto the interface 208 at a very large angle of incidence, and, taking into consideration spreading of light from the light source, also includes a portion which is projected onto the interface 208 at an angle of incidence of close to 90°. A portion 201b reflected from the interface 208 becomes stray light, and is projected through an interface 203 toward the viewer, giving rise to impairment of display quality.

In contrast, as shown in FIG. 11(a), with the light-conducting body 44 according to the present embodiment, since most of the light from the light source is projected from the light-entry surface 45 directly to the interface 43, the portion of light which is projected directly onto the interface 48, and becomes stray light, can be reduced.

In the present embodiment, as in the first embodiment above, a diffusion plate 82 and a prism sheet 81 with an apex angle of 100° are provided between the light source 26 and the light-entry surface 45. Light emitted by the light source 26 is first diffused by the diffusion plate 82, and then projected to the prism sheet 81. The function of the prism sheet is to limit the spread of the diffused light from the diffusion plate 82 to within a predetermined range of angles. In the present embodiment, since the apex angle of the prism sheet 81 is 100°, the diffused light is condensed into a range of approximately ±40°. When the light condensed into a range of approximately ±40° enters the light-conducting body 44, it is further condensed by the refraction of the light-entry surface 45, and becomes light with a range of spread of approximately ±25.4°.

Figure 12:
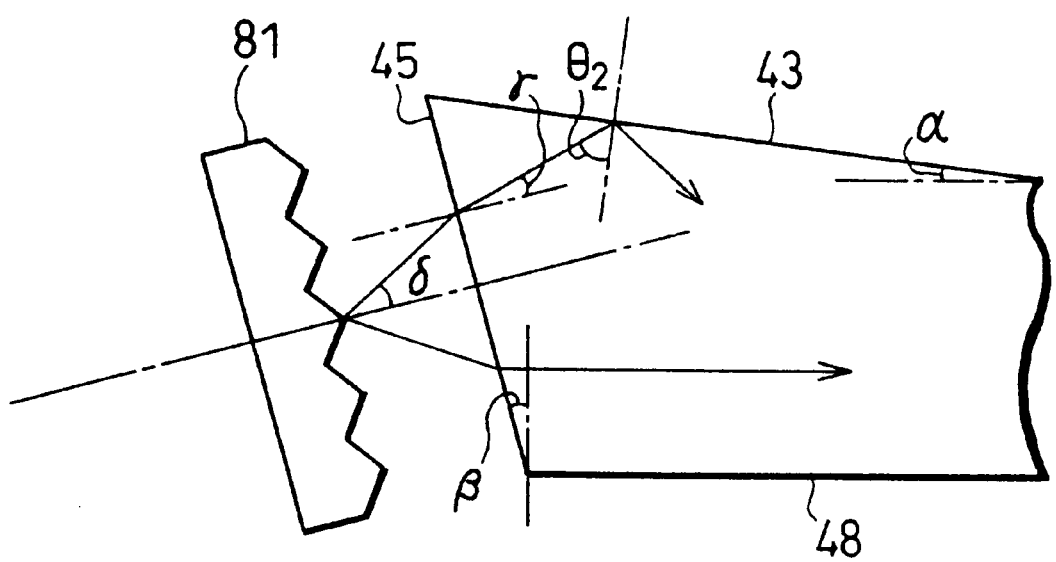
FIG. 12 is an explanatory drawing showing the behavior of light concentrated by a prism sheet after it enters a light-conducting body.

As a result, as shown in FIG. 12, if $\beta$ is the angle of the light-entry surface 45 with respect to the normal direction of the interface 48, and $\pm\gamma$ is the angle of spread of the light from the prism sheet 81 after entering the light-entry surface 45, and $\alpha$ is the angle of inclination of the interface 43 with respect to the interface 48, then the possible range of the light's angle of incidence $\theta_2$ at the interface 43 is as shown by:

$$90° - \alpha - \beta - \gamma \leq \theta_2 \leq 90° - \alpha - \beta + \gamma$$

In addition, when $\pm\delta$ is the angle of spread of the light from the light source after leaving the diffusion plate 82 and the prism sheet 81, and $n_1$ is the refractive index of the light-conducting body 44, then the following is also true:

$$\gamma = \arcsin((\sin \delta)/n_1)$$

Here, given that the refractive index of the PMMA composing the light-conducting body 44 is approximately 1.5, the critical angle $\theta_{c2}$ of the interface 43 is approximately 42°. In other words, light striking the interface 43 with an angle of incidence $\theta_2$ of less than 42° leaks through the interface 43. However, in the present embodiment, as discussed above, $\alpha=7.13°$, $\beta=14°$, and $\gamma=25.4°$, and accordingly the angle of incidence $\theta_2$ at the interface 43 falls within the range within which light is totally reflected therefrom. In other words, in the light-conducting body 44 according to the present embodiment, there is no leakage of light from the interface 43 of the light-conducting body 44.

Further, the possible range of the light's angle of incidence $\theta_1$ at the interface 48 of the light-conducting body 44 is as shown by:

$$90°-\beta-2\alpha-\gamma \leq \theta_1 \leq 90°-\beta-2\alpha+\gamma$$

In order to ensure that the front-light 40 functions well as a front illumination device, it is preferable if the following two conditions are met:

(i) light projected onto the interface 43 is totally reflected, i.e., $\theta_2 \geq \theta_{c2}$; and (ii) light projected onto the interface 48 is not reflected, i.e., $\theta_1 < \theta_{c1}$;

where $\theta_{c1}$ is the critical angle of the interface 28, and $\theta_{c2}$ is the critical angle of the interface 23.

From the above, it can be seen that it is preferable if the following are satisfied:

$$\theta_{c2} \leq 90°-\beta-\alpha \pm \gamma; \text{ and}$$

$$\theta_{c1} > 90°-\beta-2\alpha+\gamma$$

Further, when $$\gamma = \arcsin((\sin \delta)/n_1) < \beta + 2\alpha$$

is satisfied, the entirety of the light entering through the light-entry surface 45 is first reflected from the interface 43, and then passes through the interface 48 at predetermined angles of incidence. Consequently, light from the light source can be prevented from entering the liquid crystal cell 10 directly from the light-entry surface 45.

Figure 13:
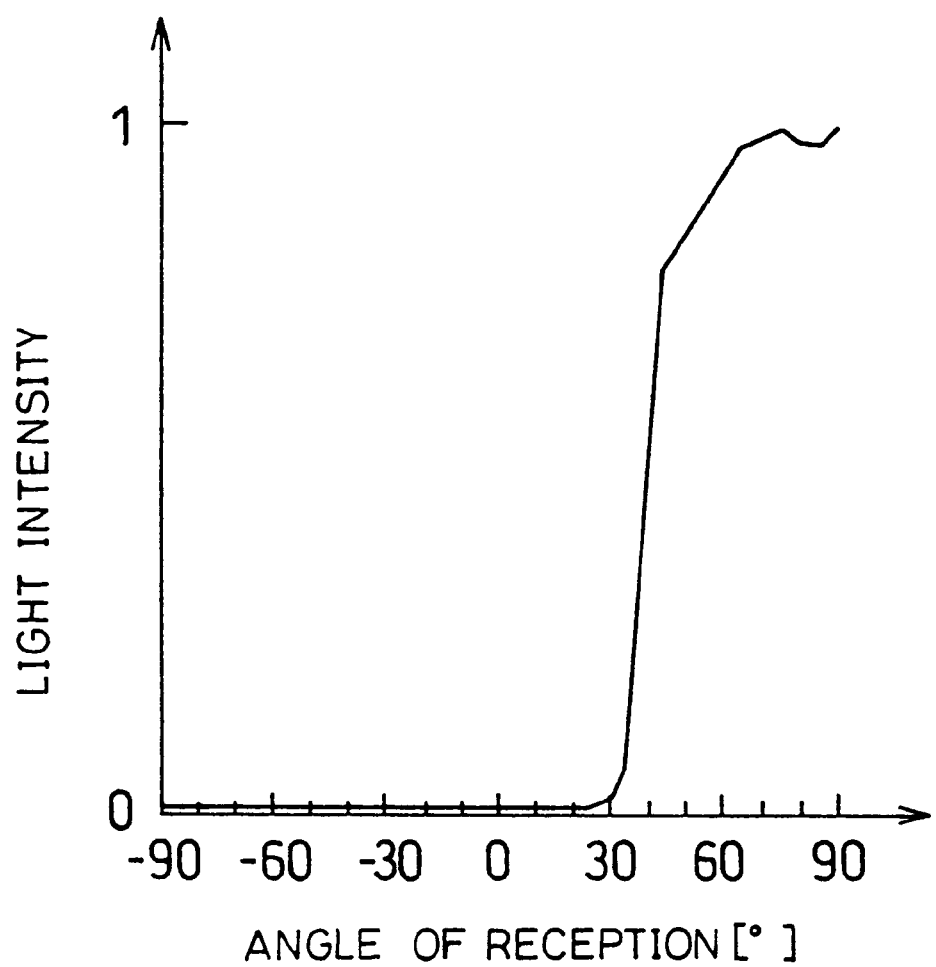
FIG. 13 is a graph showing the intensity of illumination of a front-light included in the reflection-type LCD shown in FIG. 9.

The following will explain the results of measurement of the intensity of illumination light projected from the interface 48 of the front-light 40. In making this measurement, the same measurement system was used as in the first embodiment above. The measurement results are shown in FIG. 13. A comparison of FIG. 13 with FIG. 6, which shows the results for the first embodiment above, clearly shows that in the front-light 40, intensity of illumination is improved over the front-light 20 of the first embodiment above within the range from 30° to 75°, and that light can be projected toward the liquid crystal 10 at an angle closer to perpendicular.

Figure 14:
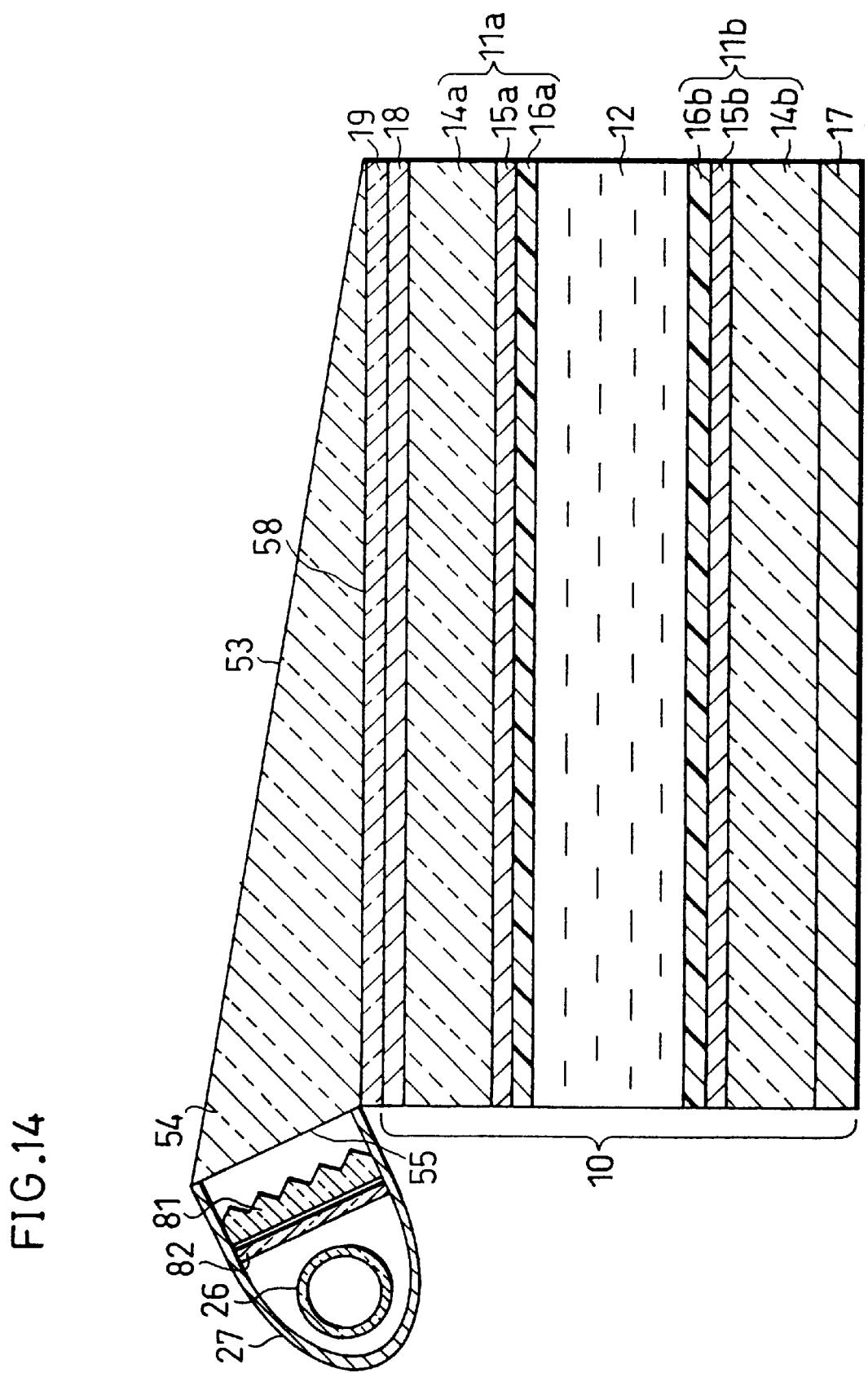
FIG. 14 is a cross-sectional drawing showing an example of an alternate structure for the reflection-type LCD shown in FIG. 9.

Incidentally, the foregoing explains an example in which the light-conducting body 44 is not perfectly wedge-shaped, but is a quadrilateral in a cross-section taken perpendicular to the longitudinal direction of the light source 26. However, instead of the light-conducting body 44, a structure like that shown in FIG. 14, provided with a perfectly wedge-shaped light-conducting body 54, may also be used. Here, "perfectly wedge-shaped" means that its shape is triangular in a cross-section perpendicular to both a light-entry surface 55 and an interface 58. With the perfectly wedge-shaped light-conducting body 54, light, among the light from the light source 26, which travels parallel to the interface 58 will not escape from the light-conducting body 54. Thus, this structure has the advantage that efficiency of use of light from the light source is further improved.

Third Embodiment

The following will explain a further embodiment of the present invention with reference to FIGS. 15 through 18. Structures having the same functions as structures explained in the foregoing embodiments will be given the same reference symbols, and explanation thereof will be omitted.

Figure 15:
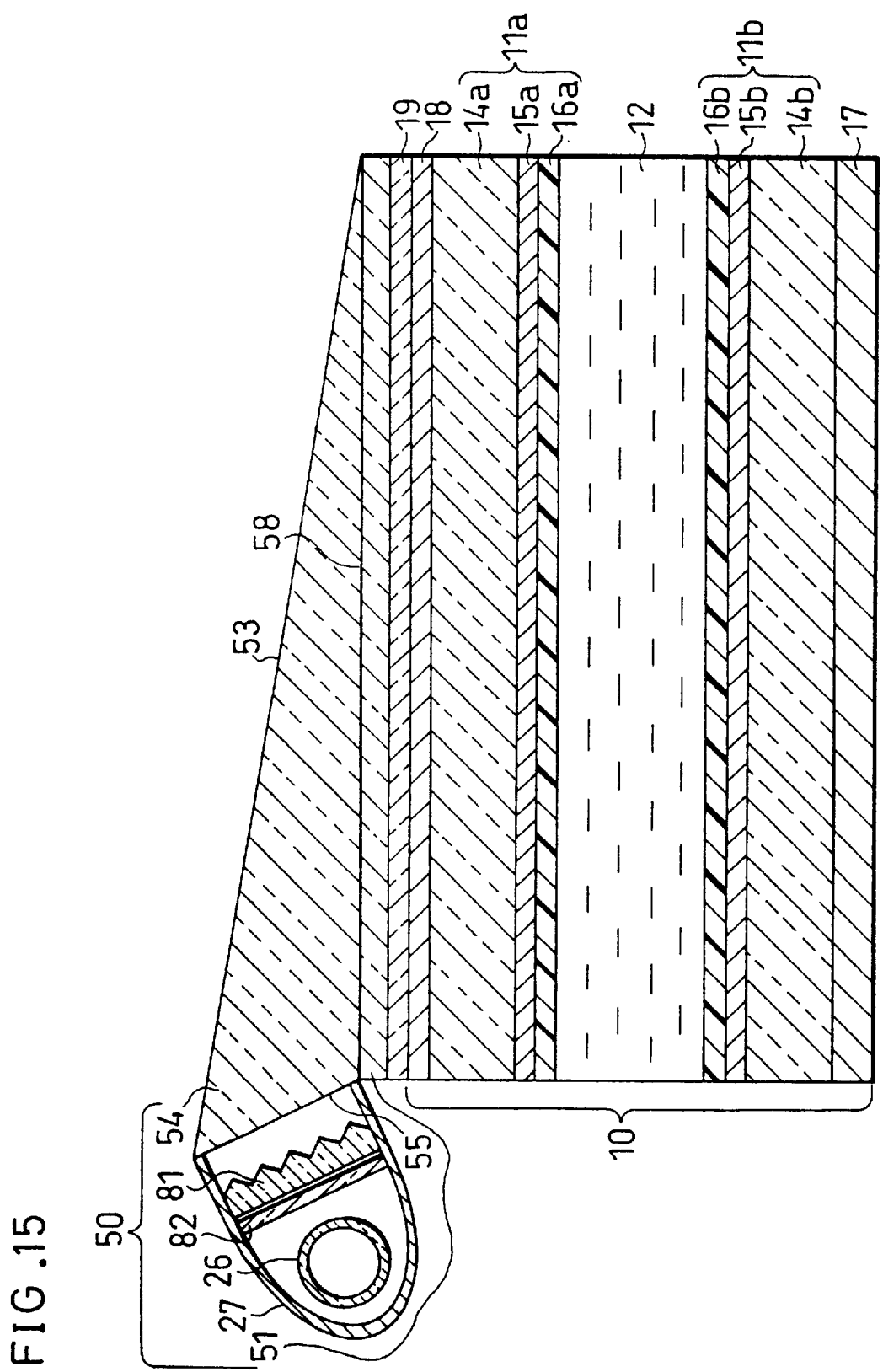
FIG. 15 is a cross-sectional drawing showing the structure of reflection-type LCDs according to further embodiments of the present invention.

As shown in FIG. 15, a reflection-type LCD according to the present embodiment is provided with a light-conducting body 54 (first light-conducting body), which is perfectly wedge-shaped (triangular in a cross-section taken perpendicular to the longitudinal direction of the light source 26), and, provided between the light-conducting body 54 and the liquid crystal cell 10, a second light-conducting body 51, which scatters light from the light-conducting body 54 in order to increase the portion thereof projected perpendicularly into the liquid crystal cell 10. In other words, the reflection-type LCD according to the present embodiment is made up of a liquid crystal cell 10 and, mounted on the front thereof, a front-light system 50 including a light source 26, a reflecting mirror 27, a diffusion plate 82, a prism sheet 81, a light-conducting body 54, and a second light-conducting body 51.

Figure 16:
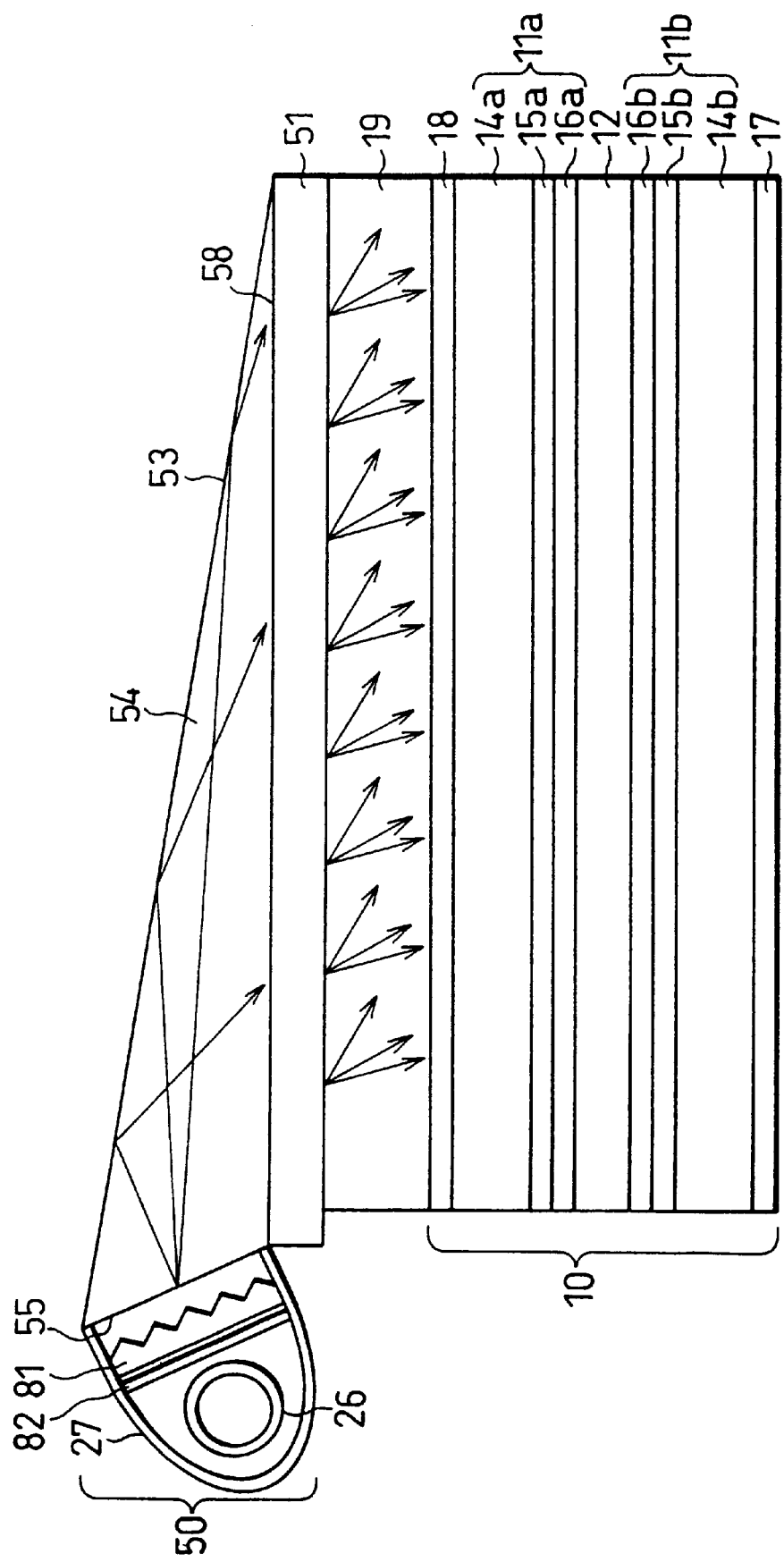
FIG. 16 is an explanatory drawing showing the behavior of light in the reflection-type LCD shown in FIG. 15.
Figure 18:
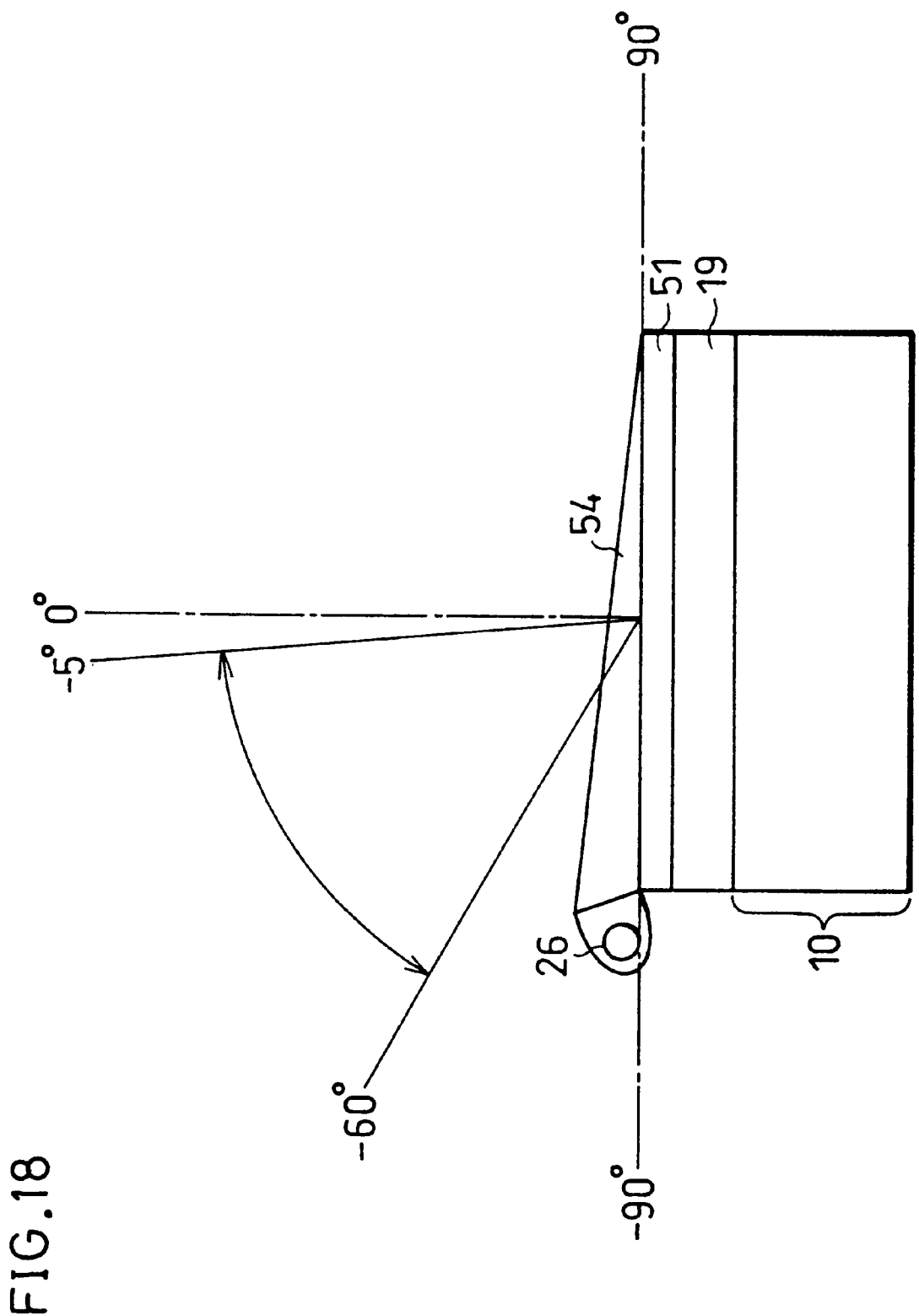
FIG. 18 is an explanatory drawing showing a range of angles of incidence of light from the first light-conducting body to the second light-conducting body in the reflection-type LCD shown in FIG. 15.

The second light-conducting body 51 is a forward-scattering plate which, as shown in FIG. 16, scatters light entering from the light-conducting body 54 only in the direction the light is traveling, and is also an anisotropic scattering plate having characteristics whereby it only scatters light entering at angles within the predetermined range shown in FIG. 18 (−5° through −60°), while fully transmitting light entering at angles outside this predetermined range. As materials meeting these conditions, products such as the viewing angle control plate made by Sumitomo Chemical Co., Ltd. (product name: Lumisty), for example, are available on the market.

Since the second light-conducting body 51 is a forward-scattering plate, the portion of light scattered backward, i.e., toward the viewer, prior to light modulation by the liquid crystal cell 10 can be eliminated, thus improving display quality. FIG. 16 schematically shows scattered light being projected from the interface between the second light-conducting body 51 and the filler agent 19, but actually, light from the light-conducting body 54 is scattered as it travels through the second light-conducting body 51.

At least part of the light entering the second light-conducting body 51 from the light-conducting body 54 has angles of incidence within the range within which the second light-conducting body 51 scatters light. For this reason, the second light-conducting body 51 only scatters light guided through the light-conducting body 54 (first light-conducting body), and transmits without acting upon all other light. Accordingly, surrounding light (when used in reflective mode) and reflected light from the liquid crystal cell 10 pass through the second light-conducting body 51 without scattering, and thus the second light-conducting body 51 has no detrimental influence on display quality in reflective mode.

In the liquid crystal cell 10, as in the first embodiment above, a gap between the polarizing plate 18 and the glass substrate 14a of the electrode substrate 11a is filled with a filler agent (not shown). Further, a gap between the polarizing plate 18 and the second light-conducting body 51 is filled with a filler agent 19, which matches the refractive indices of these two members. Further, a gap between the light-conducting body 54 (first light-conducting body) and the second light-conducting body 51 is also filled with a filler agent (not shown).

These filler agents alleviate the differences in refractive index at the optical interfaces between the light-conducting body 54 and the glass substrate 14a, thus resolving problems such as deterioration of display quality due to interference of light or reflection at the optical interfaces. Further, it is preferable to use for the filler agent a material having the same refractive index as the light-conducting body 54 and the glass substrate 14a, since by this means the number of optical interfaces can be reduced.

The present embodiment is also provided with a diffusion plate 82 and a prism sheet 81 with an apex angle of 100° between the light source 26 and the light-entry surface 55. Light emitted by the light source 26 is first diffused by the diffusion plate 82, and then projected to the prism sheet 81. The function of the prism sheet 81 is to limit the spread of the diffused light from the diffusion plate 82 to within a predetermined range of angles. In the present embodiment, since the apex angle of the prism sheet 81 is 100°, the diffused light is condensed into a range of approximately ±40°. When the light condensed into a range of approximately ±40° enters the light-conducting body 54, it is further condensed by the refraction of the light-entry surface 55, and becomes light with a range of spread of approximately ±25.4°.

In the light-conducting body 54, if α is the angle of inclination of the interface 53 with respect to the interface 58, and ±γ is the angle of spread of the light from the prism sheet 81 after entering the light-entry surface 55, then light reflected from the interface 53 has angles of incidence $\theta_1$ at the interface 58 as shown by:

$$90°-2\alpha-\beta-\gamma<\theta_1<90°-2\alpha-\beta+\gamma$$

Here, since α=7.13°, β=14°, and γ=25.4°, it can be seen that almost all of the angles of incidence $\theta_1$ fall within the range within which the second light-conducting body 51 scatters light.

Figure 17:
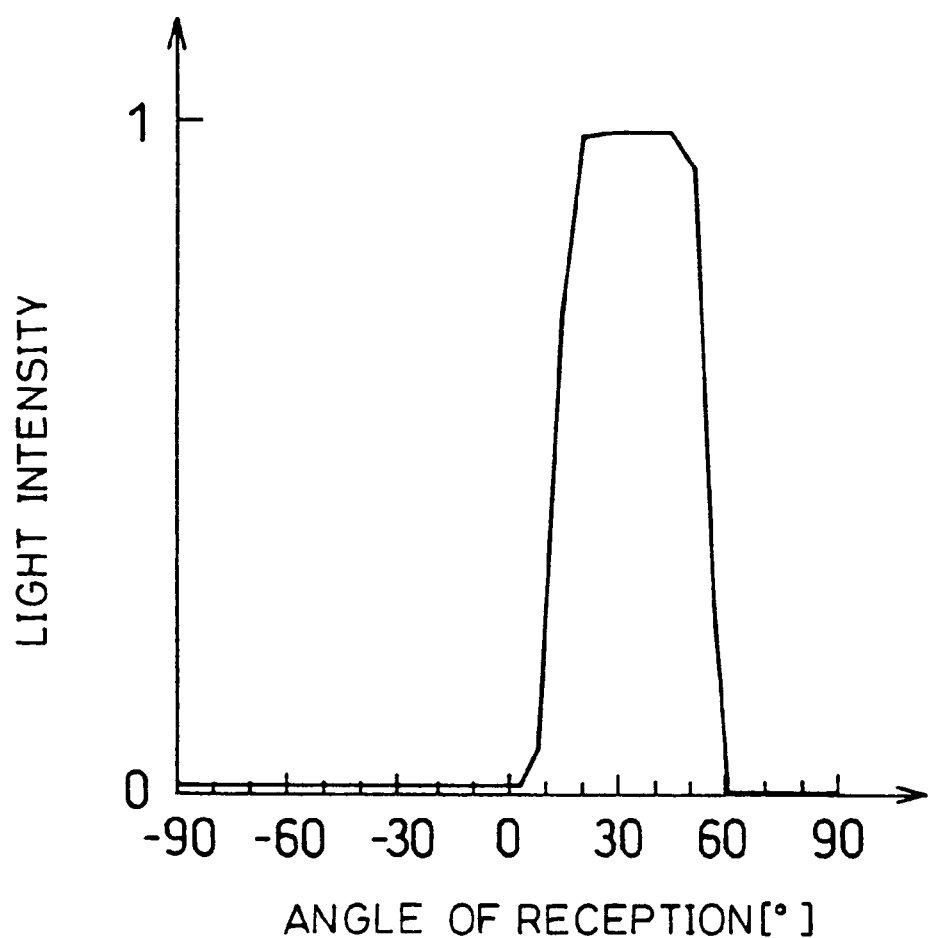
FIG. 17 is a graph showing the intensity of illumination of a front-light system which is included in the reflection-type LCD shown in FIG. 15, and which uses an anisotropic scattering plate as a second light-conducting body.

The following will explain the results of measurement of the intensity of illumination from below the second light-conducting body 51 (from the liquid crystal cell 10 side). In making this measurement, the same measurement system was used as in the first embodiment above. The measurement results are shown in FIG. 17. A comparison of FIG. 17 with FIG. 6, which shows the results for the first embodiment above, and with FIG. 13, which shows the results f or the second embodiment above, clearly shows that by providing the second light-conducting body 51 in the front-light system 50 according to the present embodiment, it was possible to project light toward the liquid crystal 10 at an angle closer to perpendicular.

Further, as shown in FIG. 18, the reflection-type LCD according to the present embodiment will rarely be viewed from a direction between −5° and −60°, the range of angles of light scattered by the second light-conducting body 51. Accordingly, within the range of normal use, scattering of light by the second light-conducting body 51 will have no influence on the display of the liquid crystal cell 10.

Incidentally, the perfectly wedge-shaped light-conducting body 54 was used in the present embodiment, but there is no need to be limited to this; it is also possible to use the light-conducting body 24 or the light-conducting body 44 explained in the first and second embodiments, respectively.

Fourth Embodiment

Figure 19:
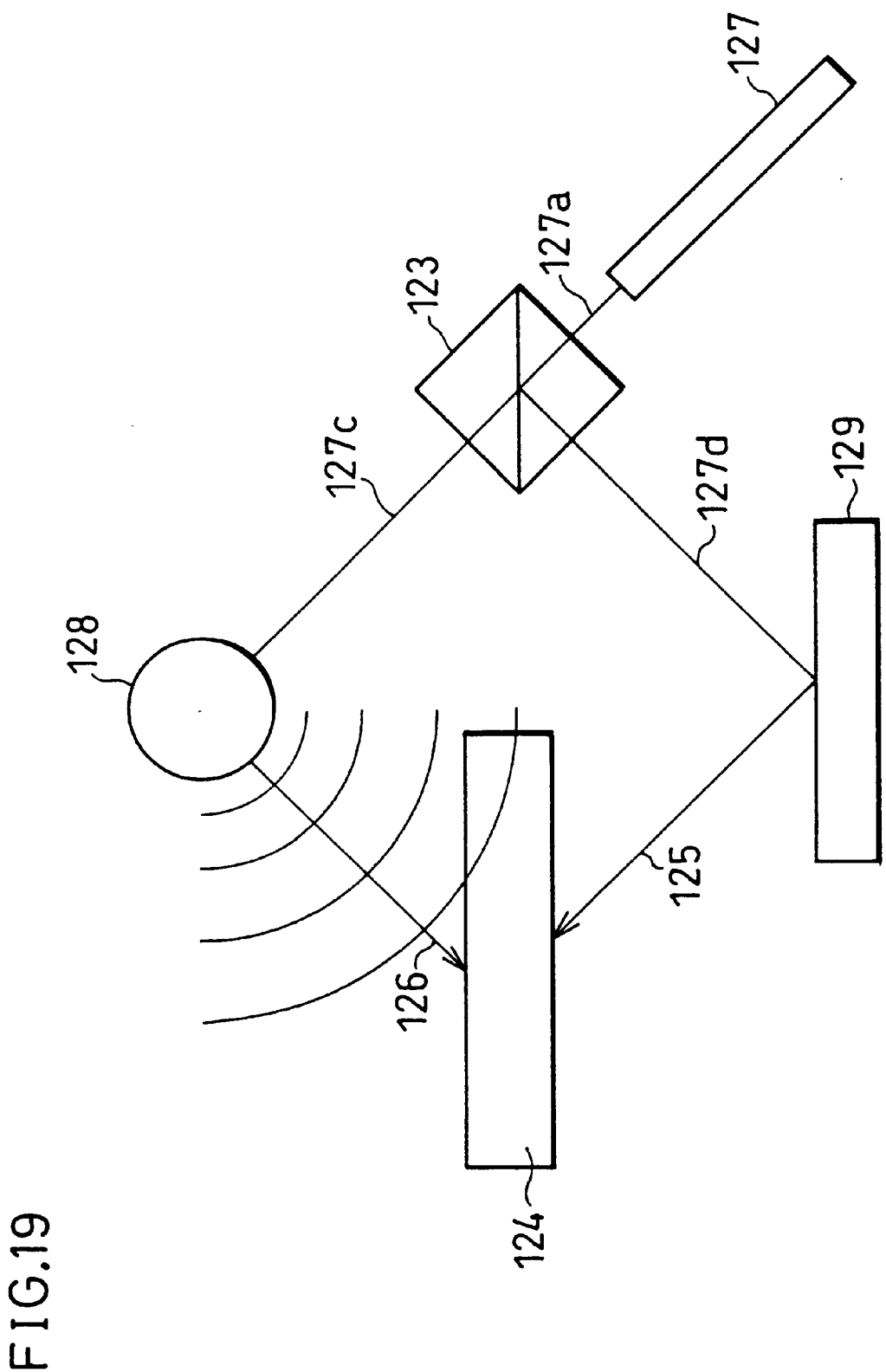
FIG. 19 is an explanatory drawing showing a typical method of preparing a hologram.
Figure 20A:
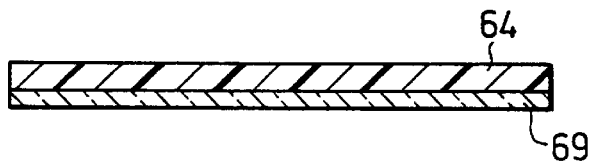
FIGS. 20(a) through 20(d) are explanatory drawings showing the main steps of a process of manufacturing a hologram to be used as a second light-conducting body of the reflection-type LCD shown in FIG. 9.
Figure 20B:
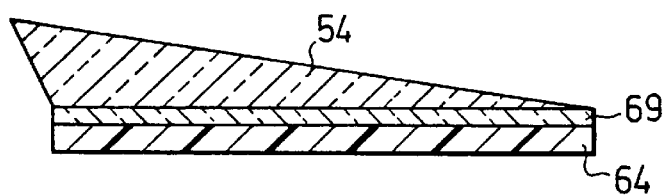
Figure 20C:
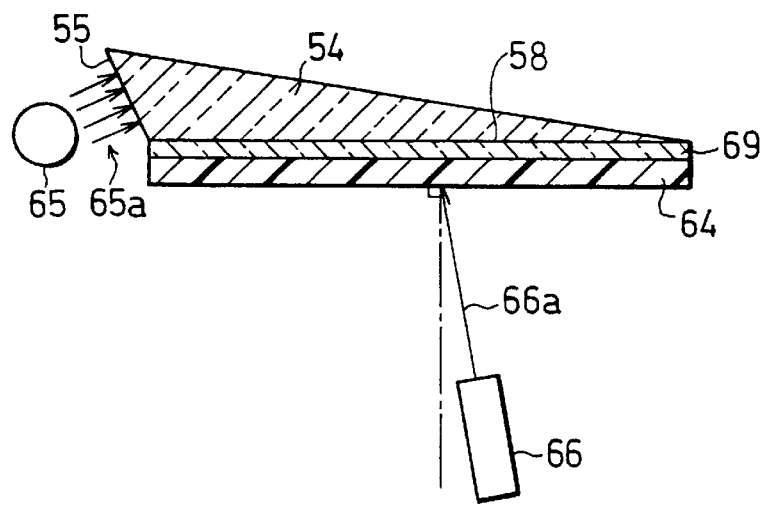
Figure 20D:
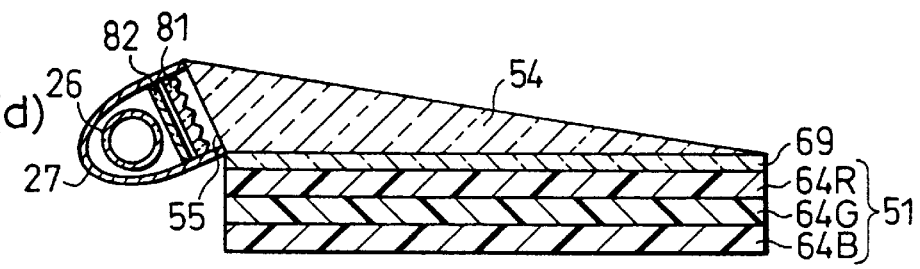
Figure 21:
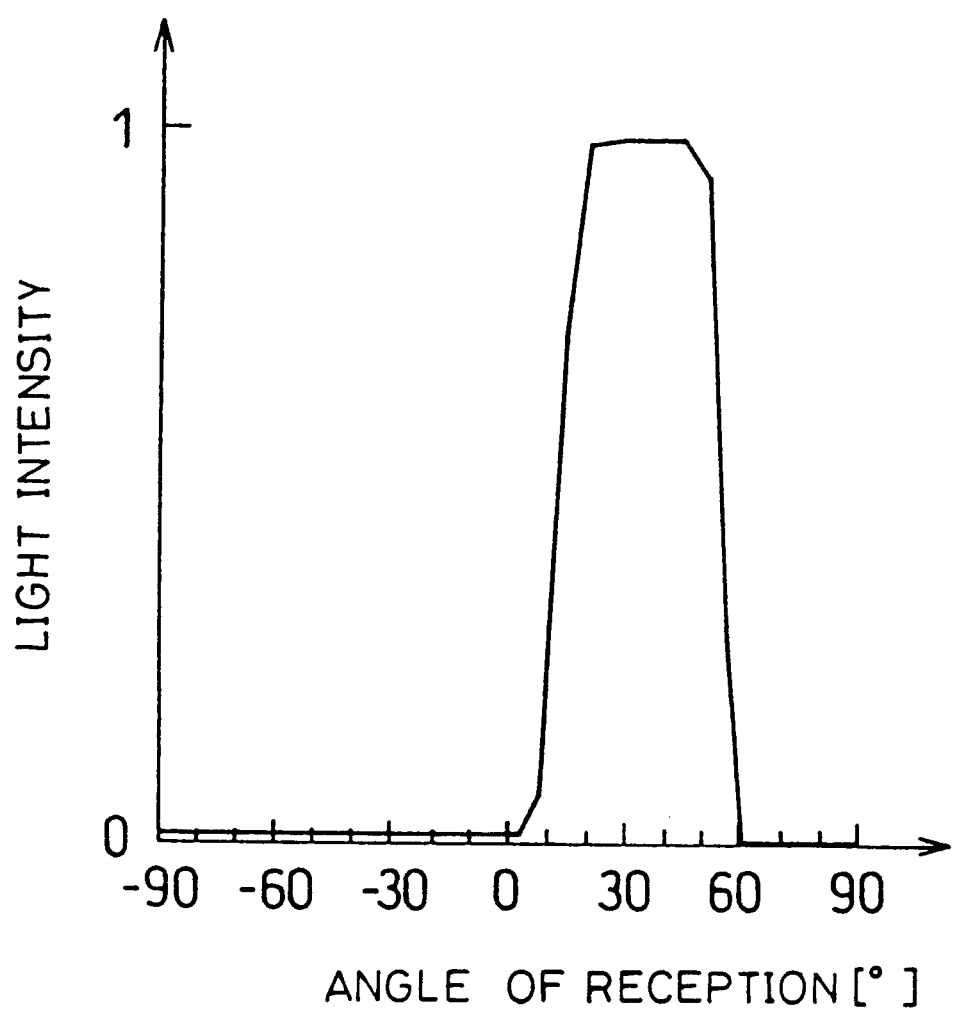
FIG. 21 is a graph showing the intensity of illumination of a front-light system which is included in the reflection-type LCD shown in FIG. 15, and which uses a hologram as a second light-conducting body.

The following will explain a further embodiment of the present invention with reference to FIGS. 19 through 21. Structures having the same functions as structures explained in the foregoing embodiments will be given the same reference symbols, and explanation thereof will be omitted.

A reflection-type LCD according to the present embodiment uses as the second light-conducting body 51 a hologram, which diffracts light from the light-conducting body 54, instead of the anisotropic scattering plate used in the third embodiment, which scatters light from the light-conducting body 54.

Since a hologram, based on the principle of light diffraction, has the effect of controlling the reflection and refraction of light, a single hologram can be given several types of optical characteristics. First, a typical method of preparing a hologram will be explained in brief, with reference to FIG. 19.

As shown in FIG. 19, light from a light source 127 is projected onto a photosensitive polymer 124 coated on the surface of a base. Light 127a projected from the light source 127 is split into light 127c and 127d by a beam splitter 123. The light 127c is scattered by an object 128, and is projected onto the photosensitive polymer 124 as object light 126. The light 127d is reflected by a mirror 129, and is projected onto the photosensitive polymer 124 at a predetermined angle as reference light 125. Due to interference between the object light 126 and the reference light 125, layers with high refractive index and layers with low refractive index are formed on a sub-micron order in the photosensitive polymer 124, thus producing a hologram. With a hologram which has been recorded in this way, by projecting light onto the hologram from the direction from which the reference light 125 was projected, the image recorded is reconstructed as object light 126.

For the light source 127, a device which produces coherent light, such as a laser, is used. By adjusting the conditions of the light from the light source 127, such as wavelength and intensity, a hologram can be produced in which the object light 126 realizes an output light of desired direction and spread angle.

The following will explain, with reference to FIGS. 20(a) through 20(d), a method of producing a front-light system 50 provided with a second light-conducting body 51 which is a hologram.

First, as shown in FIG. 20(a), a photosensitive polymer 64 is coated onto the surface of a polyester film 69 serving as a base. For the photosensitive polymer 64, a photo-polymer made by Polaroid Co. (product DMP-128), for example, may be used.

Next, the light-conducting body 54 explained in the third embodiment above is mounted, as shown in FIG. 20(b), on the side of the polyester film 69 opposite the side on which the photosensitive polymer 64 is coated. Then, as shown in FIG. 20(c), a light source 65 is placed opposite the light-entry surface 55 of the light-conducting body 54, and reference light 65a is projected through the light-entry surface 55. At the same time, a light source 66 is placed at an angle inclined 10° with respect to the normal direction of the interface 58 of the light-conducting body 54, and object light 66a is projected onto the photosensitive polymer 64. In the present embodiment, the object light 66a is projected at an angle inclined 10° from the normal direction of the photosensitive polymer 64, and the reference light 65a is projected onto the photosensitive polymer 64, which will serve as the second light-conducting body 51, at an angle of incidence equivalent to that of the light transmitted by the light-conducting body 54.

By projecting the reference light 65a and the object light 66a for each of red, green, and blue components, a red hologram 64R, a green hologram 64G, and a blue hologram 64B, corresponding to the red, green, and blue components, can be formed in separate layers, as shown in FIG. 20(d). These holograms 64R, 64G, and 64B constitute the second light-conducting body 51.

Next, the prism sheet 81, the diffusion plate 82, and a fluorescent tube (three-wavelength tube) as the light source 26 are provided opposite the light-entry surface 55 of the light-conducting body 54, and these three members are then enclosed by the reflecting mirror 27.

The present embodiment is provided with the diffusion plate 82 and the prism sheet 81 with an apex angle of 100° between the light source 26 and the light-entry surface 55. Light emitted by the light source 26 is first diffused by the diffusion plate 82, and then projected to the prism sheet 81. The function of the prism sheet 81 is to limit the spread of the diffused light from the diffusion plate 82 to within a predetermined range of angles. In the present embodiment, since the apex angle of the prism sheet 81 is 100°, the diffused light is condensed into a range of approximately ±40°. When the light condensed into a range of approximately ±40° enters the light-conducting body 54, it is further condensed by the refraction of the light-entry surface 55, and becomes light with a range of spread of approximately ±25.4°.

By mounting a front-light system 50 manufactured according to the foregoing method on the front of a liquid crystal cell 10, a reflection-type LCD can be realized which is capable of stable display without relying on surrounding light.

The following will explain the results of measurement of the intensity of illumination from below the second light-conducting body 51 (hologram) in the front-light system 50 according to the present embodiment. In making this measurement, the same measurement system was used as in the first embodiment above. The measurement results are shown in FIG. 21. A comparison of FIG. 21 with FIG. 6, which shows the results for the first embodiment above, and with FIG. 13, which shows the results for the second embodiment above, clearly shows that, by using a hologram as the second light-conducting body 51, the front-light system 50 according to the present embodiment was able to project the light from the light-conducting body 54 (angle of incidence at the hologram: approx. 70°) toward the liquid crystal 10 at an angle closer to perpendicular.

As discussed above, the reflection-type LCD according to the present embodiment is structured so that the second light-conducting body 51 is a hologram instead of the anisotropic scattering plate used in the third embodiment above. A hologram has the advantage of being able to adjust the angle of outgoing light to within a certain range with greater precision than an anisotropic scattering plate.

In the foregoing explanation, a hologram was prepared using a photosensitive polymer, but, as long as the same effect can be obtained, there is no need to be limited to this. Again, the direction of projection of the object light in recording need not be limited to the direction mentioned above. Again, in the foregoing explanation, for the sake of conformity between the direction the light-conducting body 54 transmits the light from the light source to the second light-conducting body 51 and the direction of projection of the reference light, the reference light 65a was projected through the light-entry surface 55 of the light-conducting body 54, but another method having the same effect, such as attaching a previously recorded hologram plate to the light-conducting body 54, may also be adopted.

Further, the perfectly wedge-shaped light-conducting body 54 was used in the present embodiment, but it is also possible to use the light-conducting body 24 or the light-conducting body 44 explained in the first and second embodiments, respectively.

Fifth Embodiment

The following will explain a further embodiment of the present invention with reference to FIG. 15 and FIGS. 22 through 25. Structures having the same functions as structures explained in the foregoing embodiments will be given the same reference symbols, and explanation thereof will be omitted.

As shown in FIG. 15, in a reflection-type LCD according to the present embodiment, a front-light system 50, which includes a perfectly wedge-shaped light-conducting body 54 (first light-conducting body) and a second light-conducting body 51, is layered on the front of a liquid crystal cell 10, with a filler agent 19 filling a gap therebetween. In other words, a reflection-type LCD according to the present embodiment has the same basic structure as the reflection-type LCD according to the fourth embodiment above.

However, in the reflection-type LCD according to the present embodiment, the light-conducting body 54 is provided with a maximum thickness (the length of a vertical line from the end of the interface 53 nearest the light source 26 to the plane including the interface 58) of 3 mm, a length of 90 mm, and a width of 110 mm. The angle of incline α of the interface 53 with respect to the interface 58 was 1.91°. Again, the angle β of the light-entry surface 55 with respect to the normal direction of the interface 58 was 26.6°. It is preferable to perform optical polishing on the interface 53 and the light-entry surface 55.

The present embodiment is also provided with the diffusion plate 82 and the prism sheet 81 between the light source 26 and the light-entry surface 55. However, the apex angle of the prism sheet 81 in the present embodiment is 70°. Light emitted by the light source 26 is first diffused by the diffusion plate 82, and then projected to the prism sheet 81. The function of the prism sheet 81 is to limit the spread of the diffused light from the diffusion plate 82 to within a predetermined range of angles.

Figure 22:
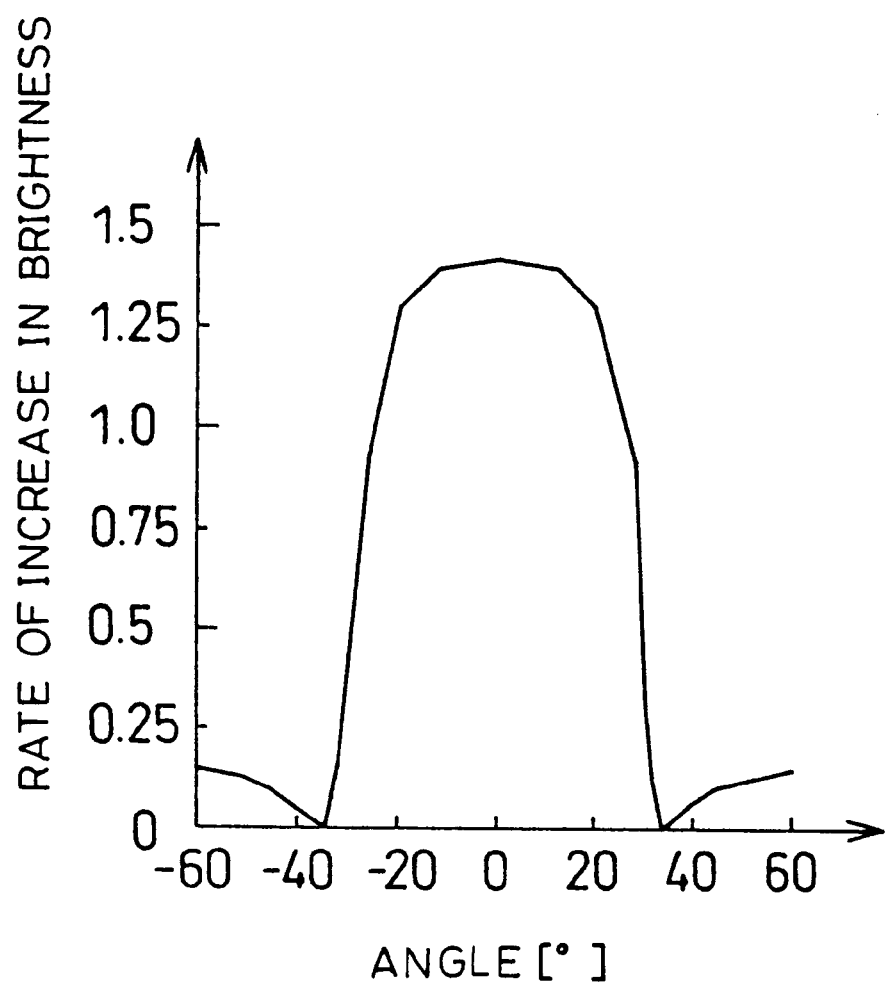
FIG. 22 is a graph showing light concentrating characteristics of a prism sheet to be used in a reflection-type LCD which is a further embodiment of the present invention.

In the present embodiment, since the apex angle of the prism sheet 81 is 70°, the spread of the diffused light is limited to within a range of approximately ±30°, as shown in FIG. 22. When the light condensed into a range of approximately ±30° enters the light-conducting body 54, it is further condensed by the refraction of the light-entry surface 55, and becomes light with a range of spread of approximately ±19.5°.

As a result, if β is the angle of the light-entry surface 55 with respect to the normal direction of the interface 58, and ±γ is the angle of spread of the light from the prism sheet 81 after entering the light-entry surface 55, and α is the angle of inclination of the interface 53 with respect to the interface 58, then the possible range of the light's angle of incidence $\theta_2$ at the interface 53 is as shown by:

$$90°-\alpha-\beta-\gamma \leq \theta_2 \leq 90°-\alpha-\beta+\gamma$$

In addition, when ±δ is the angle of spread of the light from the light source after leaving the diffusion plate 82 and the prism sheet 81, and $n_1$ is the refractive index of the light-conducting body 54, then the following is also true:

$$\gamma = \arcsin((\sin \delta)/n_1)$$

Here, given that the refractive index of the PMMA composing the light-conducting body 54 is approximately 1.5, the critical angle $\theta_{c2}$ of the interface 53 is approximately 42°. In other words, light striking the interface 53 with an angle of incidence $\theta_2$ of less than 42° leaks through the interface 53. However, in the present embodiment, as discussed above, $\alpha=1.91°$, $\beta=26.6°$, and $\gamma=19.5°$, and accordingly the angles of incidence $\theta_2$ at the interface 53 fall within the range within which light is totally reflected therefrom. In other words, in the present embodiment, there is no leakage of light from the interface 53 of the light-conducting body 54.

Further, a hologram prepared by means of the same process as that described in the fourth embodiment above is used for the second light-conducting body 51. However, in consideration of the requirements of design of the light-conducting body 54 (first light-conducting body), the hologram in the present embodiment is designed so as to scatter light having angles of incidence within a range from 40° to 80°. This hologram is composed of layers with a refractive index of 1.51 and layers with a refractive index of 1.54. The critical angle $\theta_{c1}$ of the interface 58, which is the interface between the light-conducting body 54 (first light-conducting body) and the second light-conducting body 51, is around 80°.

In order to ensure that the front-light system 50 functions well as a front illumination device, it is preferable if the following two conditions are met, where, in the light-conducting body 54, $\theta_{c1}$ is the critical angle of the interface 58, and $\theta_{c2}$ is the critical angle of the interface 53:

(i) light projected onto the interface 53 is totally reflected, i.e., $\theta_2 \leq \theta_2$; and (ii) light projected onto the interface 58 is not reflected, i.e., $\theta_1 < \theta_{c1}$:

From the above, it can be seen that it is preferable if the following are satisfied:

$$\theta_{c2} \leq 90° - \beta - \alpha - \gamma; \text{ and}$$

$$\theta_{c1} > 90° - \beta - 2\alpha + \gamma$$

In the present embodiment, since the critical angle $\theta_{c2}$ of the interface 53 is approximately 42°, the critical angle $\theta_{c1}$ of the interface 58 is approximately 80°, $\alpha=1.91°$, $\beta=26.6°$, and $\gamma=19.5°$, it can be seen that both of the foregoing conditions are met.

Figure 23:
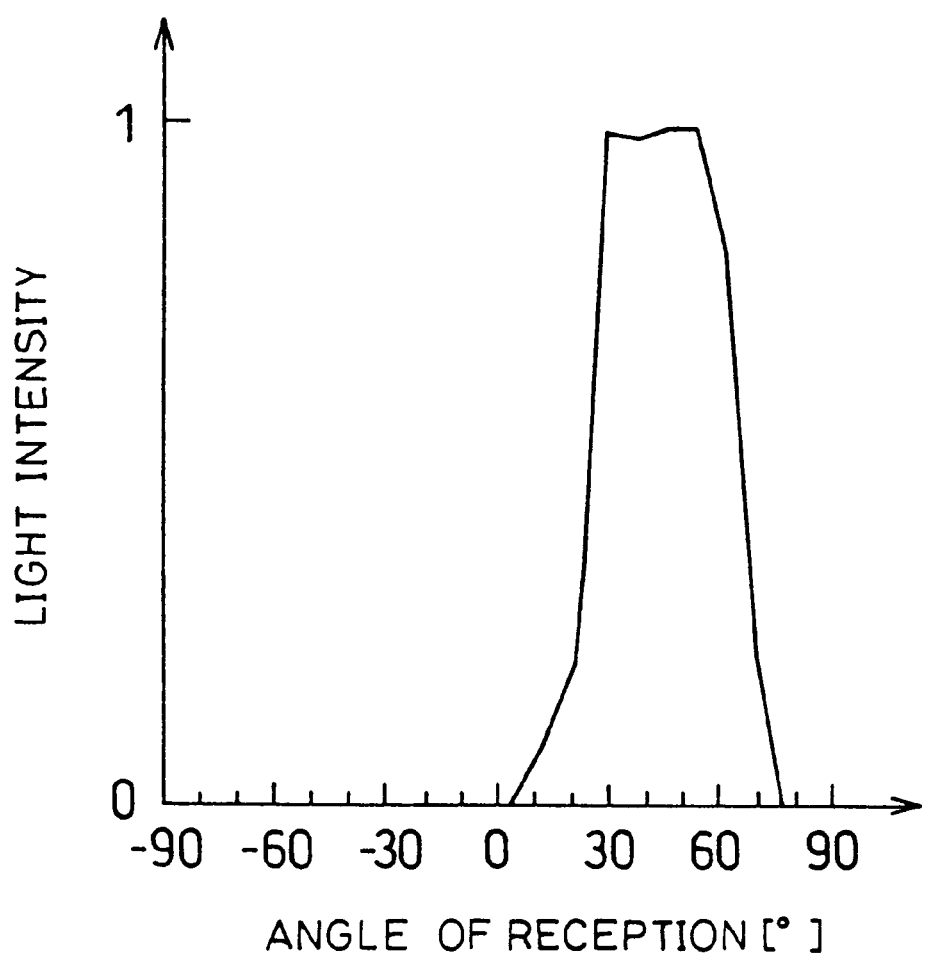
FIG. 23 is a graph showing the intensity of illumination of a front-light system included in the foregoing reflection-type LCD.

The following will explain the results of measurement of the intensity of illumination from below the second light-conducting body 51 (hologram) in the front-light system 50 according to the present embodiment. In making this measurement, the same measurement system was used as in the first embodiment above. The measurement results are shown in FIG. 23. A comparison of FIG. 23 with FIG. 6, which shows the results for the first embodiment above, with FIG. 13, which shows the results for the second embodiment above, and with FIG. 17, which shows the results for the third embodiment above, clearly shows that, with the front-light system 50 according to the present embodiment, it was possible to almost completely eliminate light leakage within a range of angles designed not to project exit light (−90° to 0°). Consequently, it is possible to further improve display quality, and to improve the auxiliary illumination characteristics of the front-light system 50.

Figure 24:
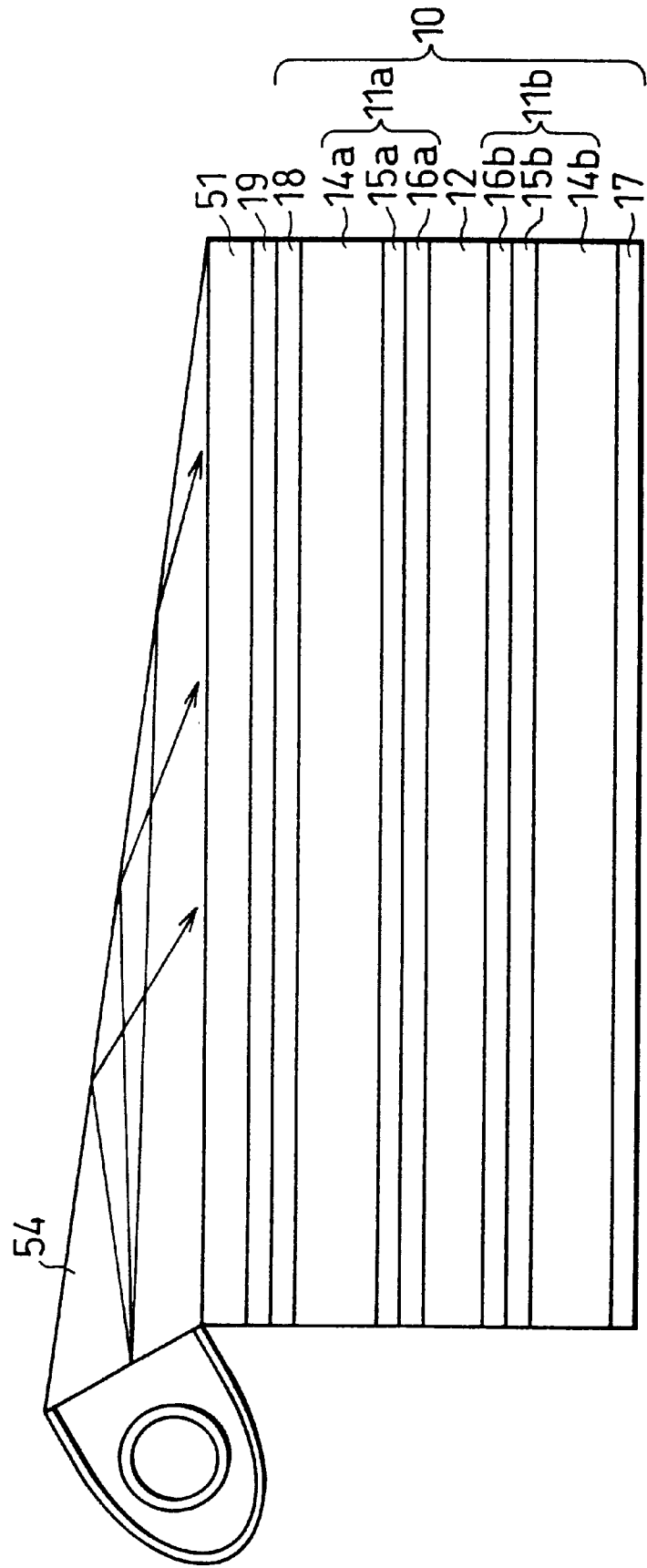
FIG. 24 is an explanatory drawing showing the behavior of light concentrated onto only a light-entry surface of a light-conducting body by a reflecting mirror in the foregoing reflection-type LCD.

As shown in FIG. 24, the front-light system 50 according to the present embodiment, as in each of the foregoing embodiments, is provided with a reflecting mirror 27 as a light-condensing means, which concentrates light from the light source 26 onto only the light-entry surface 55. The reflecting mirror 27 has the effect of improving the efficiency of use of light from the light source 26 by concentrating the light from the light source 26 onto the light-entry surface 55 without waste. In addition, the reflecting mirror 27 also has the effect explained below.

Figure 25:
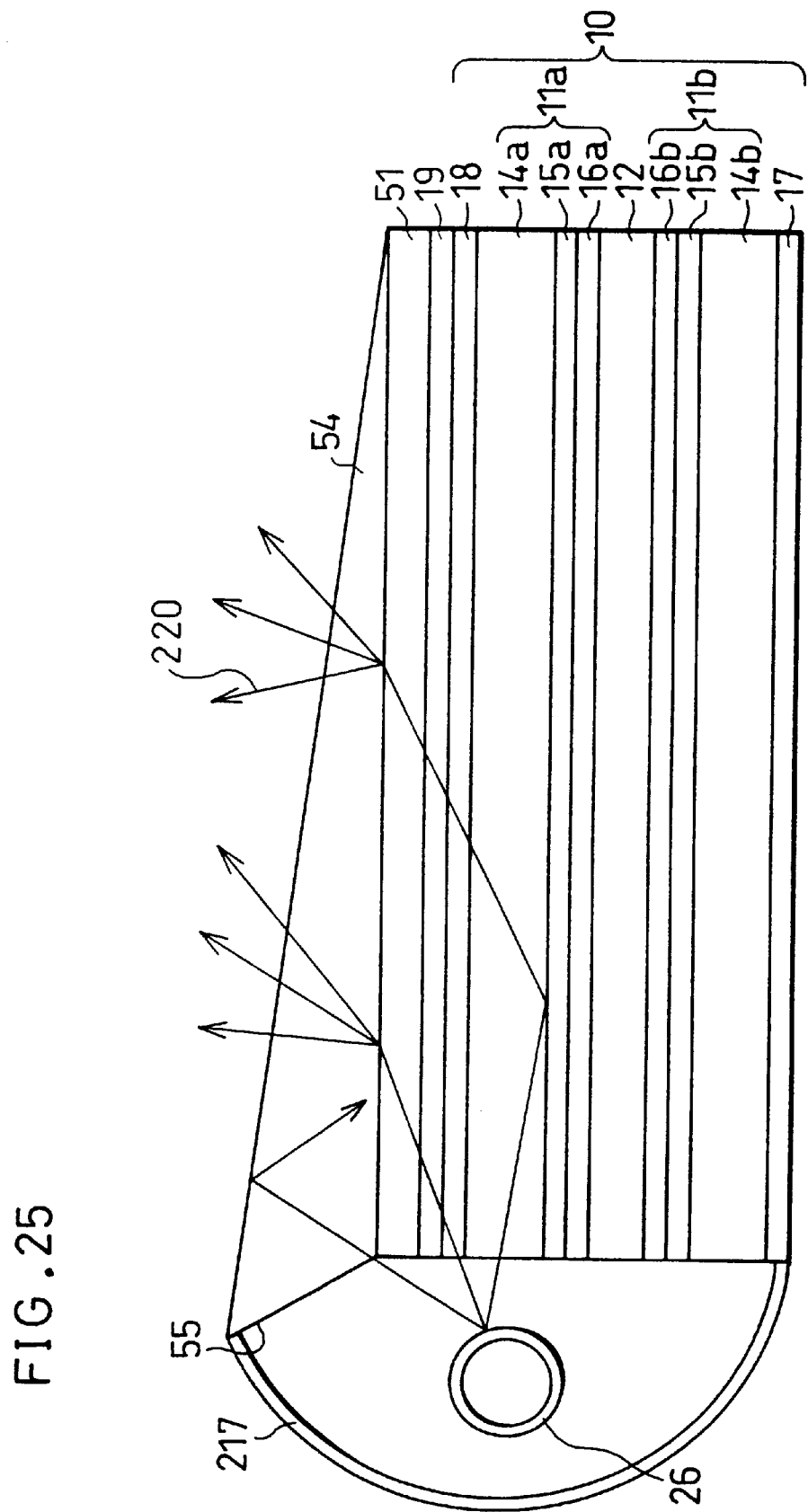
FIG. 25 is an explanatory drawing showing, for purposes of comparison to FIG. 24, the behavior of light projected both onto the light-entry surface of the light-conducting body and onto the side of a liquid crystal cell.
Figure 26:
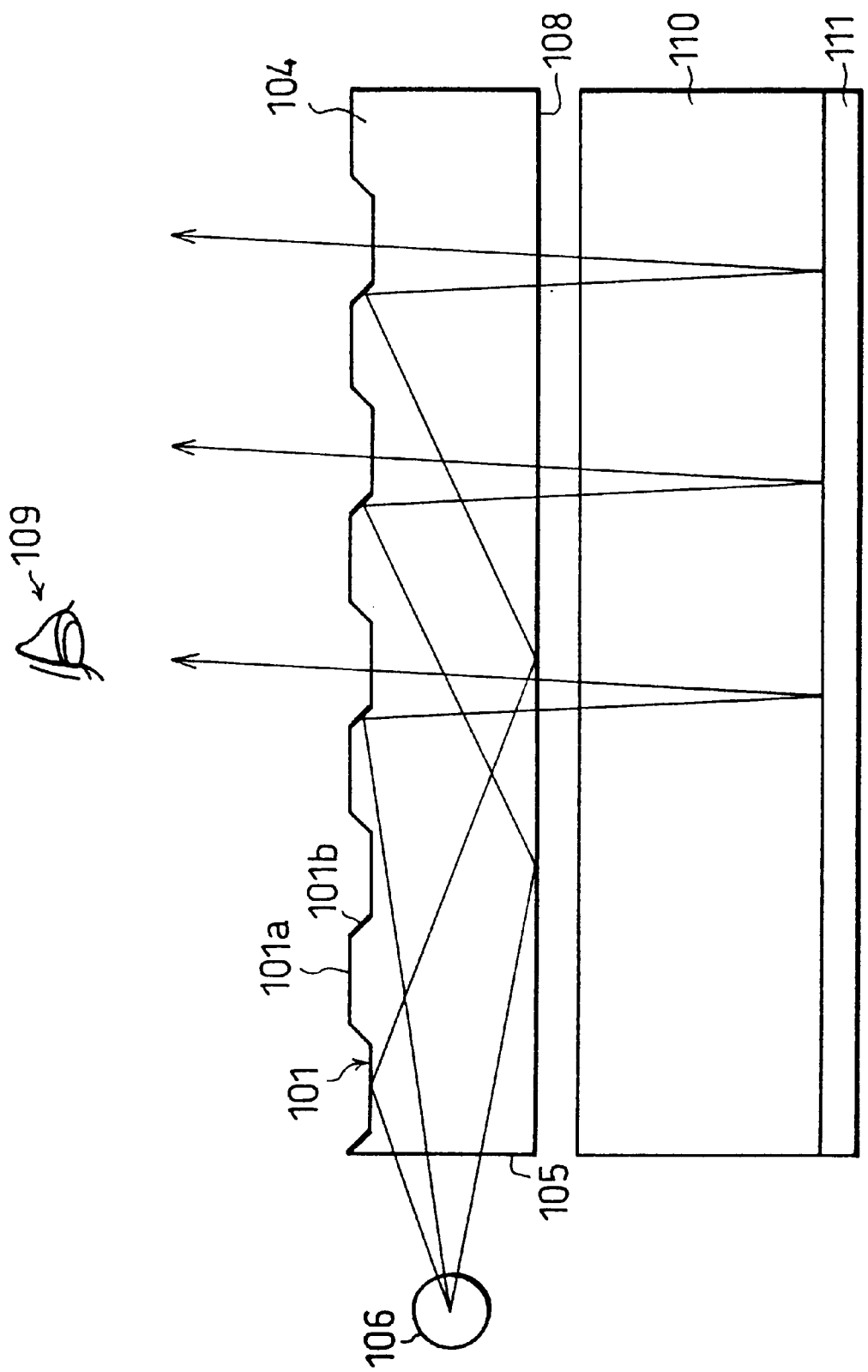
FIG. 26 is an explanatory drawing showing the basic structure of a conventional reflection-type LCD with auxiliary illumination, and showing the behavior of light in such a conventional reflection-type LCD.
Figure 27:
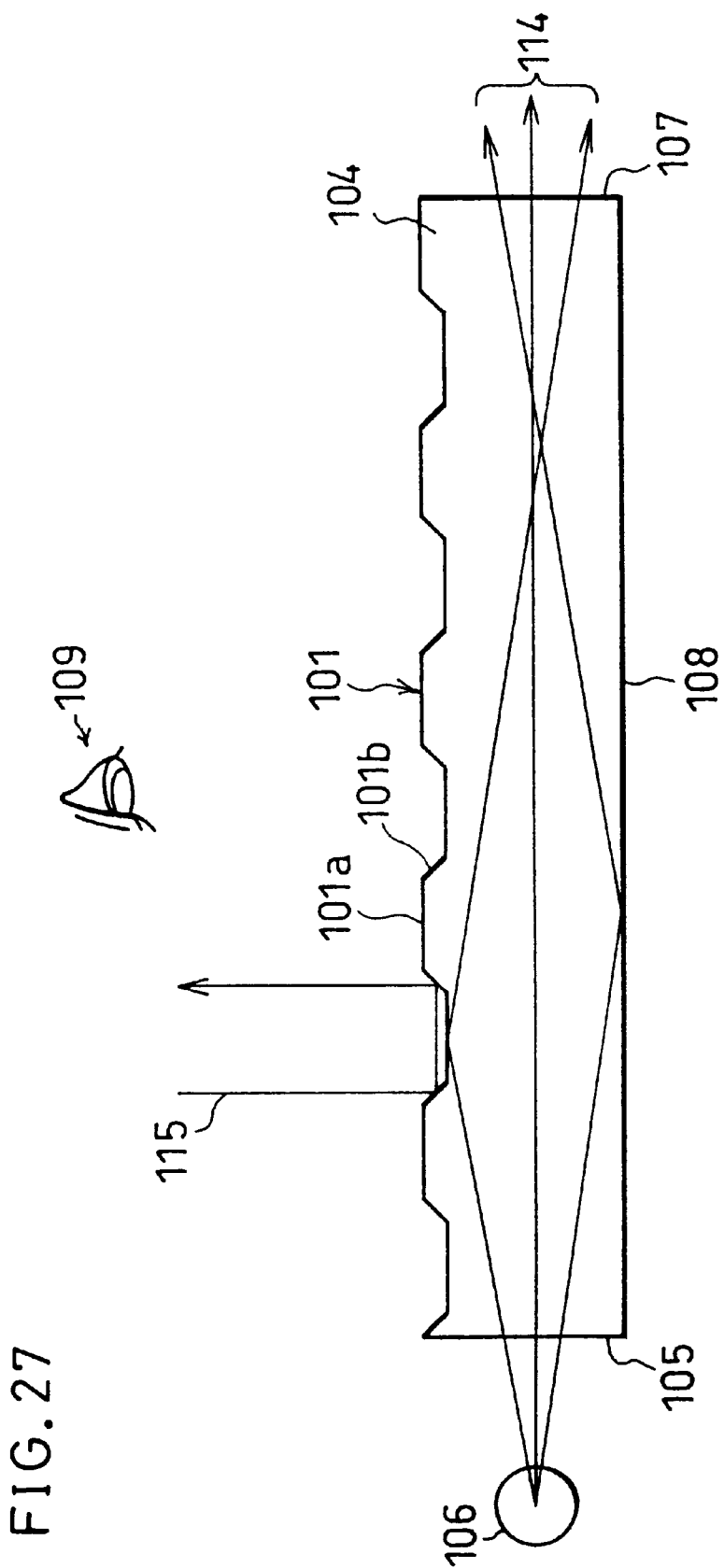
FIG. 27 is an explanatory drawing showing the behavior of light in the conventional reflection-type LCD shown in FIG. 26.

For comparative purposes, FIG. 25 shows a hypothetical structure in which the light source 26 is surrounded by a reflecting mirror 217, which allows light to enter not only the light-entry surface 55, but also the side of the liquid crystal cell 10. With this structure, as shown in FIG. 25, light entering from the side of the liquid crystal cell 10 is unnecessarily refracted and scattered at optical interfaces formed by refractive bodies such as the glass substrate 14a of the liquid crystal cell 10. As a result, some light is projected toward the viewer as stray light 220.

In contrast, in the front-light system 50 according to the present embodiment, since the reflecting mirror 27 concentrates light from the light source 26 onto only the light-entry surface 55, this kind of stray light can be reduced. As a result, efficiency of use of light from the light source is improved, and a reflection-type LCD with superior display quality can be realized.

Incidentally, FIGS. 24 and 25 do not show the diffusion plate 82 and the prism sheet 81 discussed above, but the reflecting mirror 27 has an equivalent effect in a structure provided with the diffusion plate 82 and the prism sheet 81. Further, the reflecting mirror 27 has the same effect in the front-light 20 of the first embodiment, the front-light 40 of the second embodiment, etc.

The foregoing embodiments do not limit the present invention; many variations are possible within the scope of the present invention. For example, PMMA was cited as a specific example of a material for a light-conducting body of a front-light system, but any material able to conduct light uniformly without attenuation, and having a refractive index which is a suitable value, may be used, such as glass, polycarbonate, polyvinyl chloride, polyester, etc.

In addition, for the liquid crystal cell, various types of LCD may be used, such as simple matrix LCD, active matrix LCD, etc. Again, the foregoing embodiments used an ECB mode (single polarizing plate mode) liquid crystal cell, in which a single polarizing plate serves as both polarizer and analyzer, but other modes not using a polarizing plate may also be applied, such as PDLC, PC-GH, etc.

As explained in the foregoing embodiments, a front illumination device according to the present invention comprises a light-conducting body which is a polyhedron provided with a light-entry surface, through which light from a light source enters, a first light exit surface, through which light exits toward an illuminated object, and a second light exit surface opposite the first light exit surface; the first and second light exit surfaces being provided substantially parallel, or such that the interval therebetween grows smaller the greater the distance from the light-entry surface; and the light-entry surface being provided so as to incline with respect to the normal direction of the first light exit surface.

Consequently, the area of the light-entry surface can be increased, in comparison with a structure in which the light-entry surface is provided perpendicular to the first light exit surface, without increasing the greatest thickness of the light-conducting body from the first light exit surface. Further, since light entering perpendicular to the light-entry surface is projected onto the first or second light exit surface, light can be prevented from escaping from the light-conducting body without contributing to illumination. As a result, a bright front illumination device, which uses light from the light source efficiently, can be provided.

In the front illumination device according to the present invention, it is preferable if the angle of the light-entry surface with respect to the first light exit surface is an obtuse angle.

This can reduce the portion of light which is projected onto the first light exit surface at a very large angle of incidence, and which is thus reflected from the first light exit surface, becomes stray light, and travels through the second light exit surface toward the viewer. As a result, a front illumination device can be provided which uses light from the light source efficiently, and which enables a bright illuminated object image.

The front illumination device according to the present invention may also be structured such that a light control means for limiting the spread of light from the light source is provided between the light source and the light-entry surface.

In this case, since the light from the light source is given a certain amount of directivity, the amount of light leaking out through the second light exit surface is reduced, thus further improving the efficiency of light use, and preventing bleeding and blurring of the image of the illuminated object. As a result, a front illumination device can be provided which realizes a bright, clear illuminated object image.

The concrete embodiments and examples of implementation discussed in the foregoing detailed explanations of the present invention serve solely to illustrate the technical details of the present invention, which should not be narrowly interpreted within the limits of such concrete examples, but rather may be applied in many variations without departing from the spirit of the present invention and the scope of the patent claims set forth below.

What is claimed is:

1. A front illumination device, comprising:
   a light source;
   a first light-conducting body which guides light from said light source to an object to be illuminated, which is to be used by mounting in front of said object to be illuminated;
   wherein said first light-conducting body is a polyhedron provided with a light-entry surface through which light from said light source enters, a first light exit surface through which light exits toward said object to be illuminated, and a second light exit surface opposite said first exit surface;
   wherein said first and second light exit surfaces are provided so as to be substantially parallel;
   wherein said light-entry surface is provided so as to incline with respect to a normal direction of said first light exit surface;
   a light control means, provided between said light source and said light-entry surface, which limit spread of light from said light source; and
   wherein the following inequality is satisfied, $$\arcsin((\sin \delta)/n_1) < \beta$$

where $\beta$ is an angle formed by said light-entry surface and a normal direction of said first light exit surface, $n_1$ is a refractive index of said first light-conducting body, and $\pm\delta$ is an angle of spread of light limited by said light-control means.

2. The front illumination device set forth in claim 1, wherein:
   an angle formed by said light-entry surface and said first light exit surface is an obtuse angle.

3. The front illumination device set forth in claim 1, wherein:
   in a cross-section taken along a plane perpendicular to said light-entry surface and to said first light exit surface, said first light-conducting body has a triangular shape.

4. The front illumination device set forth in claim 1, wherein:
   the following inequality is satisfied, $$\theta_{c2} \leq 90° - \beta - \gamma$$

where $\beta$ is an angle formed by said light-entry surface and a normal direction of said first light exit surface, $\pm\gamma$ is an angle of spread of light after entering said first light-conducting body, and $\theta_{c2}$ is a critical angle of said second light exit surface.

5. The front illumination device set forth in claim 1, further provided with:
   light-condensing means, which converge light from said light source onto only said light-entry surface of said first light-conducting body.

6. A front illumination device, comprising:
   a light source;
   a first light-conducting body which guides light from said light source to an object to be illuminated, which is to be used by mounting in front of said object to be illuminated;
   wherein said first light-conducting body is a polyhedron provided with a light-entry surface through which light from said light source enters, a first light exit surface through which light exits toward said object to be illuminated, and a second light exit surface opposite said first exit surface;
   wherein said first and second light exit surfaces are provided such that an interval therebetween grows smaller the greater a distance from said light-entry surface;
   wherein said light-entry surface is provided so as to incline with respect to a normal direction of said first light exit surface;
   a light control means, provided between said light source and said light-entry surface, which limit spread of light from said light source; and
   wherein the following inequality is satisfied, $$\arcsin((\sin \delta)/n_1) < \beta + 2\alpha$$

where $\alpha$ is an angle of inclination of said second light exit surface with respect to said first light exit surface, $\beta$ is an angle formed by said light-entry surface and a normal direction of said first light exit surface, $n_1$ is a refractive index of said first light-conducting body, $\pm\delta$ is an angle of spread of light limited by said light-control means, and $\theta_{c2}$ is a critical angle of said second light exit surface.

7. The front illumination device set forth in claim 6, wherein:
   the following inequality is satisfied, $$\theta_{c2} \leq 90° - \beta - \alpha - \gamma$$

wherein $\alpha$ is an angle of inclination of said second light exit surface with respect to said first light exit surface, $\beta$ is an angle formed by said light-entry surface and a normal direction of said first light exit surface, $\pm\gamma$ is an angle of spread of light after entering said first light-conducting body, and $\theta_{c2}$ is a critical angle of said second light surface.

8. The front illumination device as set forth in claim 6, wherein an angle formed by said light-entry surface and said first light exit surface is an obtuse angle.

9. The front illumination device as set forth in claim 6, wherein:

in a cross-section taken along a plane perpendicular to said light-entry surface and to said first light exit surface, said first light-conducting body has a triangular shape.

10. A front illumination device, comprising:

a light source;

a first light-conducting body which guides light from said light source to an object to be illuminated, which is to be used by mounting in front of said object to be illuminated;

wherein said first light-conducting body is a polyhedron provided with a light-entry surface through which light from said light source enters, a first light exit surface through which light exits toward said object to be illuminated, and a second light exit surface opposite said first exit surface;

wherein said first and second light exit surfaces are provided substantially parallel, or such that an interval therebetween grows smaller the greater a distance from said light-entry surface;

wherein said light-entry surface is provided so as to incline with respect to a normal direction of said first light exit surface;

a second light-conducting body provided outside said first light exit surface of said first light-conducting body; and said second light-conducting body transmitting light projected from said first light exit surface such that light exits said second light-conducting body in a direction closer to a normal direction of said first light exit surface than a direction in which light exits said first light exit surface.

11. The front illumination device set forth in claim 10, wherein:

said second light-conducting body is a light-scattering body, which scatters light.

12. The front illumination device set forth in claim 11, wherein:

said light-scattering body is a forward-scattering body.

13. The front illumination device set forth in claim 11, wherein:

said light-scattering body is an anisotropic scattering body, which only scatters incident light having angles of incidence within a predetermined range; and at least part of the light projected from said first light-conducting body into said second light-conducting body has angles of incidence falling within the predetermined range.

14. The front illumination device set forth in claim 10, wherein:

said second light-conducting body is a diffracting element, which diffracts light.

15. The front illumination device set forth in claim 14, wherein:

said diffracting element only diffracts light having angles of incidence within a predetermined range; and at least part of the light projected from said first light-conducting body into said diffracting element has angles of incidence falling within the predetermined range.

16. The front illumination device set forth in claim 14, wherein:

said diffracting element is a hologram.

17. The front illumination device set forth in claim 10, wherein:

a gap between said first and second light-conducting bodies is filled with a filler agent, which alleviates differences in refractive indices at optical interfaces between said first and second light-conducting bodies.

18. The front illumination device set forth in claim 17, wherein:

said first and second light exit surfaces of said first light-conducting body are provided so as to be substantially parallel; and the following inequality is satisfied $$\theta_{c1} > 90° - \beta + \gamma$$

wherein $\beta$ is an angle formed by said light-entry surface and a normal direction of said first light exit surface of said first light-conducting body, $\pm\gamma$ is an angle of spread of light after entering said first light-conducting body, and $\theta_{c1}$ is a critical angle of said first light exit surface of said first light-conducting body.

19. The front illumination device set forth in claim 17, wherein:

said first and second light exit surfaces of said first light-conducting body are provided such that an interval therebetween grows smaller the greater a distance from said light-entry surface; and the following inequality is satisfied, $$\theta_{c1} > 90° - \beta - 2\alpha + \gamma$$

where $\alpha$ is an angle of inclination of said second light exit surface of said first light-conducting body with respect to said first light exit surface of said first light-conducting body, $\beta$ is an angle formed by said light-entry surface and a normal direction of said first light exit surface of said first light-conducting body, $\pm\gamma$ is an angle of spread of light after entering said first light-conducting body, and $\theta_{c1}$ is a critical angle of said first light exit surface of said first light-conducting body.

20. The front illumination device as set forth in claim 6, further comprising light-condensing means, which converge light from said light source onto only said light-entry surface of said first light-conducting body.

21. A reflection-type liquid crystal display device, comprising:

a reflection-type liquid crystal element which has a reflective plate;

a front illumination device provided on the front of said reflection-type liquid element;

wherein a gap between said reflection-type liquid crystal element and said front illumination device is filled with a filler agent, which alleviates differences in refractive indices at optical interfaces between said reflection-type liquid crystal element and said front illumination device; and wherein the front illumination device includes:

a light source, a first light-conducting body which guides light from said light source to an object to be illuminated, which is to be used by mounting in front of said object to be illuminated, wherein said first light-conducting body is a polyhedron provided with a light-entry surface through which light from said light source enters, a first light exit surface through which light exits toward said object to be illuminated, and a second light exit surface opposite said first exit surface, wherein said first and second light exit surfaces are provided substantially parallel, or such that an interval therebetween grows smaller the greater a distance from said light-entry surface, and wherein said light-entry surface is provided so as to incline with respect to a normal direction of said first light exit surface.

22. The reflection-type liquid crystal display device set forth in claim 21, wherein;

said first and second light exit surfaces of said first light-conducting body of said front illumination device are provided so as to be substantially parallel; and the following inequality is satisfied, $$\theta_{c1} > 90° - \beta + \gamma$$

where $\beta$ is an angle formed by said light-entry surface of said first light-conducting body and a normal direction of said first light exit surface of said first light-conducting body, $\pm\gamma$ is an angle of spread of light after entering said first light-conducting body, and $\theta_{c1}$ is a critical angle of said first light exit surface of said first light-conducting body.

23. The reflection-type liquid crystal display device set forth in claim 21, wherein:

said first and second light exit surfaces of said first light-conducting body of said front illumination device are provided such that an interval therebetween grows smaller the greater a distance from said light-entry surface of said first light-conducting body; and the following inequality is satisfied, $$\theta_{c1} > 90° - \beta - 2\alpha + \gamma$$

where $\alpha$ is an angle of inclination of said second light exit surface of said first light-conducting body with respect to said first light exit surface of said first light-conducting body, $\beta$ is an angle formed by said light-entry surface of said first light-conducting body and a normal direction of said first light exit surface of said first light-conducting body, $\pm\gamma$ is an angle of spread of light after entering said first light-conducting body, and $\theta_{c1}$ is a critical angle of said first light exit surface of said first light-conducting body.

24. The reflection-type liquid crystal display device set forth in claim 21, further provided with:

light-condensing means, which converge light from the light source onto only said light-entry surface of said first light-conducting body.

* * * * *